United States Patent Office 3,014,954
Patented Dec. 26, 1961

---

3,014,954
POLYPHOSPHORUS ESTERS AND METHOD OF PREPARING SAME
Gail H. Birum, Dayton, Ohio, assignor to Monsanto Chemical Company, St. Louis, Mo., a corporation of Delaware
No Drawing. Filed June 16, 1959, Ser. No. 820,618
16 Claims. (Cl. 260—461)

The present invention relates to organic compounds of phosphorus and more particularly provides a new and valuable class of organic compounds containing a plurality of pentavalent phosphorus ester radicals and a single trivalent phosphorus ester radical, methods of preparing the same, and hydrocarbon fuels comprising said compounds as adjuvants.

The presently provided compounds have the general formula

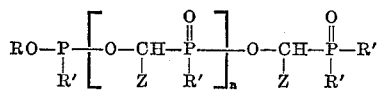

wherein R is selected from the class consisting of alkyl, haloalkyl, alkenyl, haloalkenyl, alkoxyalkyl, aryloxyalkyl, alkoxyhaloalkyl and aryloxyhaloalkyl radicals of from 1 to 12 carbon atoms, R' is selected from the class consisting of —OR and aromatic hydrocarbyl and halohydrocarbyl radicals of from 6 to 12 carbon atoms, Z is selected from the class consisting of hydrogen and hydrocarbyl, halohydrocarbyl, carboalkoxyhydrocarbyl, alkylthiohydrocarbyl, alkoxyhydrocarbyl, and cyanohydrocarbyl radicals of from 1 to 17 carbon atoms, and the furyl and thienyl radicals and $n$ is a number of at least 1.

According to the invention, compounds of the above formula are readily prepared by reacting together a trivalent phosphorus ester with an aldehyde and an organic phosphorus compound having halogen attached to the phosphorus atom thereof, the ratio of the three reactants being such that the aldehyde and halogen compound are present in substantially equimolar proportions and the trivalent phosphorus ester is present in less than an equimolar proportion with respect to the other two reactants. Upon mixing together the three reactants in the 1:1:1 proportion, there is probably first formed a trivalent phosphorus ester of a hydroxy pentavalent phosphorus ester, e.g., one of the classes of compounds disclosed in my copending application, Serial No. 780,209, filed December 15, 1958, now abandoned, and in application, Serial No. 27,505, filed May 9, 1960, which application is a continuation-in-part of said abandoned application. It is formed according to the scheme:

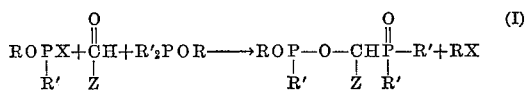

wherein R, R', and Z are defined above, and X is selected from the class consisting of chlorine and bromine. The reaction schematically shown above results in depletion of the phosphorus ester R'₂POR since it was present in the initial reaction mixture in a quantity which was less than equimolar based on the halogen compound and on the aldehyde. Unreacted halogen compound and unreacted aldehyde are still present, however, and they react with the reaction product (I), according to the scheme:

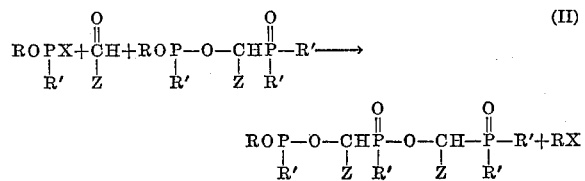

The compound (II) can then react with a trivalent phosphorus halogen compound and an aldehyde in the way that compound (I) or the compound R'₂POR do. It thus reacts as follows:

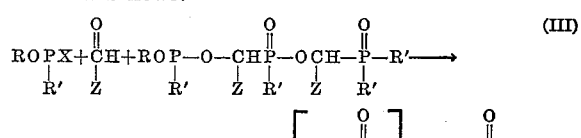

The compound (III) also reacts as do (II), (I) or the compound R'₂POR with a trivalent phosphorus halogen compound and an aldehyde, thus:

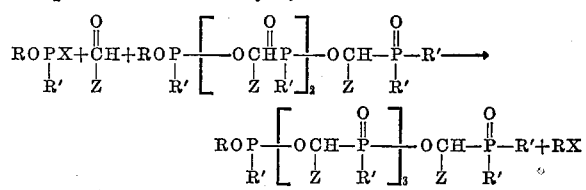

From the above, it is apparent that the presence of repeating units

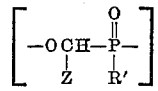

in a product prepared from the ester R'₂POR, the phosphorohalidite and the aldehyde, depends upon whether the quantity of the phosphite present in the initial reaction mixture is less on a molar basis than the quantity of phosphorohalidite or phosphonohalidite and aldehyde. Whenever it is less, the 1:1:1 reaction product

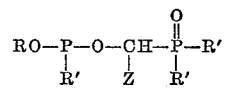

functions as a trivalent phosphorus ester R'₂POR, and reacts with the excess of halidite and aldehyde present. The product thus formed in turn functions as a trivalent phosphorus ester, so that the presently provided method in effect involves a chain reaction to give a mixture of compounds having varying proportions of the repeating unit

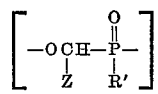

The compound which is formed from a 1:1:1 molar mixture of the trivalent phosphorus halogen compound, the aldehyde and the trivalent phosphorus ester is a phosphite-phosphonate when the ester and the halidite are derived from phosphorous acid, thus:

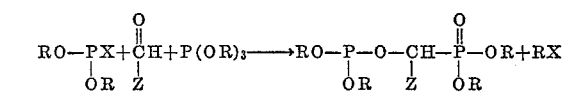

When the ester and the halidite are derived from a hydrocarbyl- or halohydrocarbylphosphonous acid, the 1:1:1 product is a phosphonite-phosphinate, thus:

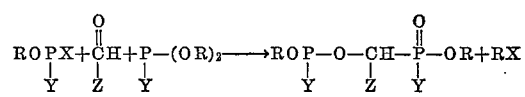

where Y is a hydrocarbyl or halohydrocarbyl radical.
When the ester is derived from phosphorous acid and the halidite is derived from a phosphonous acid the 1:1:1 product is a phosphonite-phosphonate, thus:

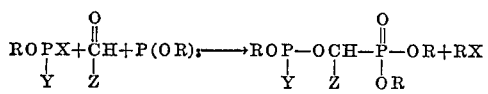

When the ester is derived from a phosphonous acid and the halidite is derived from phosphorous acid, the product is a phosphite-phosphinate, thus:

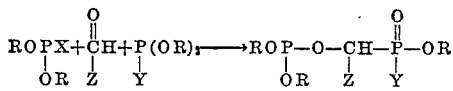

When the ester is derived from a phosphinous acid and the halidite is derived from a phosphorous acid, the product is a phosphite-phosphine oxide:

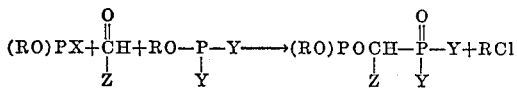

Similarly with the same ester and a phosphonohalidite instead of the phosphorohalidite, the product is a phosphonite-phosphine oxide:

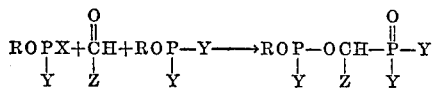

The 1:1:1 reaction products are thus phosphite-phosphonates, phosphonite-phosphinates, phosphonite-phosphonates, phosphite - phosphinates, phosphite - phosphine oxides, or phosphonite-phosphine oxides. There is always present one trivalent phosphorus ester group and one pentavalent phosphorus ester group. The unit

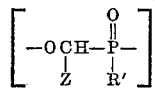

which is introduced into the 1:1:1 molecule by reaction with an aldehyde and a trivalent phosphorus halide always has a pentavalent phosphorus atom, and the R' is always derived from the phosphorus halogen compound, being the oxy group —OR when the halogen compound is derived from phosphorous acid or the hydrocarbyl or halohydrocarbyl radical Y when the halogen compound is derived from a phosphonous acid. The presently provided compounds are thus compounds having a single trivalent phosphorus ester radical and a plurality of pentavalent phosphorus ester radicals. One such pentavalent radical is present, of course, in the 1:1:1 reaction product. The number of the additional pentavalent phosphorus ester groups is a function of the quantity of phosphorus halogen compound and aldehyde available. When these are present only in small excess with respect to the originally employed trivalent phosphorus ester, the reaction mixture will consist primarily of the 1:1:1 product, with minor proportions of compounds having one or more of the groups

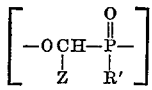

As the excess of halogen compound and the aldehyde in the initial reaction mixture increases, or more halogen compound and aldehyde are added to the reaction mixture, the final product contains increasingly greater quantities of compounds having a plurality of pentavalent phosphorus ester groups, i.e., phosphonate or phosphinate radicals. Depending upon the available phosphorus halogen compound and the available aldehyde, a great many pentavalent phosphorus ester units can be introduced into the 1:1:1 product. Generally speaking the polyphosphonate or polyphosphinate product will consist of a mixture of compounds having a varying number, say, from 1 to 100 of the phosphonate or phosphinate units in addition to that present in the 1:1:1 reaction product. Mixtures comprising the 1:1:1 reaction products and the polyphosphonates or polyphosphinates may be used as such for a wide variety of commercial and agricultural purposes. However, if desired, the 1:1:1 products can be removed by isolating procedures customarily employed by those skilled in the art, e.g., by distillation, solvent extraction, etc. Also narrow cuts of the higher ratio products can be obtained by techniques such as molecular distillation, chromatography, etc.

Although a convenient means of preparing the present polyphosphonates or polyphosphinates comprises employing, in an initial reaction mixture, less than an equimolar quantity of trivalent phosphorus ester with respect to the phosphorus halide and aldehyde, the present polyphosphonates or polyphosphinates can also be prepared by starting with a previously prepared 1:1:1 reaction product and adding the phosphorus halide and the carbonyl compound thereto. Thus, from a 1:1:1 mixture of a phosphorus halogen compound such as dimethyl phosphorochloridite, an aldehyde such as propionaldehyde and a trivalent phosphorus ester such as triethyl phosphite there is obtained, according to the process of said copending application, Serial No. 780,209, the dimethyl phosphite of diethyl 1-hydroxypropylphosphonate:

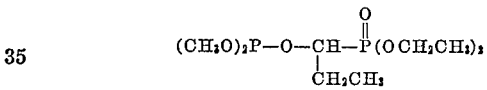

This compound can then be converted to one having a plurality of pentavalent phosphorus radicals by reacting it with additional quantities of the dimethyl phosphorochloridite and of the propionaldehyde to give the phosphite-polyphosphonate

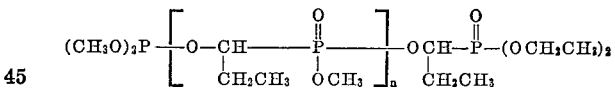

where n is at least one. Or, instead of using the same trivalent phosphorus halide and the same aldehyde which was used for preparing the dimethyl phosphite of diethyl 1-hydroxypropylphosphonate, there may be used a different trivalent phosphorus halide, e.g., 2-chloroethyl ethylphosphonochloridite and a different aldehyde, e.g., benzaldehyde. In this case, the reaction proceeds as follows:

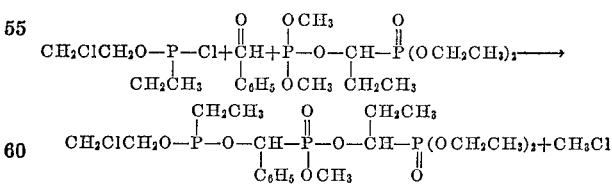

The above polyphosphonate can then be reacted with still a different trivalent phosphorus halogen compound, e.g., diallyl phosphorochloridite and still a different aldehyde, e.g., 3-methoxypropionaldehyde, to give a compound containing a plurality of dissimilar pentavalent phosphorus ester radicals. Thus:

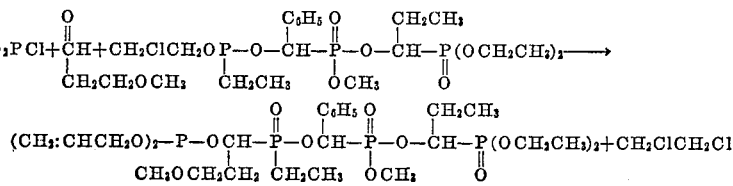

It is thus apparent that in the repeating units

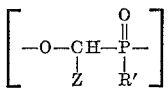

the substituents Z and R' need not be the same radical in all of the units of the poly phosphorus ester. The present invention thus provides a great diversity of compounds having a single trivalent phosphorus radical and plurality of pentavalent phosphorus radicals.

The invention is particularly suited to the production of phosphite-polyphosphonates from mixtures consisting of bis(haloalkyl) phosphorohalidites and less than an equimolar proportion of tris(haloalkyl) phosphites which mixtures are readily obtainable by reaction of a phosphorus trihalide with an olefin oxide in certain ratios. As disclosed in my copending application, Serial No. 780,262, filed December 15, 1958, the reaction of two moles of phosphorus trichloride or phosphorus tribromide with five moles of an olefin oxide, e.g., ethylene oxide, results in the production of an equimolar mixture of a phosphorochloridite and a tribasic phosphite, thus:

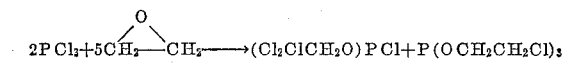

However, when there is used with the two moles of phosphorus trichloride a quantity of alkylene oxide which is less than five moles, but greater than four moles, the reaction product contains less of tribasic phosphite than of phosphorochloridite. For example, using 2 moles of phosphorus trihalide and 4.98 moles of alkylene oxide, the reaction product consists essentially of 0.98 mole of tribasic phosphite and 1.02 moles of phosphorohalidite. Using 2 moles of phosphorus trihalide and 4.95 moles of alkylene oxide, the reaction product consists of about 0.95 mole of phosphite and 1.05 moles of the halidite. As the number of moles of the alkylene oxide per 2 moles of phosphorus trichloride approaches 4, there is an increasingly greater content of phosphorohalidite in the reaction product. The variation of halidite to ester ratio in the reaction product of an alkylene oxide and phosphorus trihalide is shown below.

| Moles of alkylene oxide per 2 moles of PCl₃ or PBr₃ | Moles of halidite in product per mole of phosphite |
|---|---|
| 4.80 | 1.5 |
| 4.67 | 2.0 |
| 4.50 | 3.0 |
| 4.40 | 4.0 |
| 4.33 | 5.0 |
| 4.29 | 6.0 |
| 4.25 | 7.0 |
| 4.17 | 11.0 |
| 4.09 | 21.0 |

The average number of the units

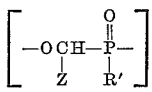

in the polyphosphorus compounds obtained by reacting the phosphite-halidite mixture with an aldehyde in a quantity which is at least equimolar with respect to the halidite increases with increasing halidite ratio. When the phosphite to halidite ratio is 0.98:1.02, the reaction product consists of about 96% on a molar basis of the 1:1:1 halidite-aldehyde-ester compound (which has none such unit) and about 4% on a molar basis of a compound having one such unit. When the phosphite to halidite ratio is 0.95:1:1.05, the reaction product consists of about 89.5% on a molar basis of a compound having none such units and about 10.5% on a molar basis of a compound having one such unit. As the halidite content of the phosphorus trichloride-alkylene oxide reaction product increases, the number of said units in the product obtained therefrom by reaction with an aldehyde increases, as is apparent from the table below:

| Molar ratio of halidite to phosphite | Average number of repeating units in aldehyde product |
|---|---|
| 1.02:0.98 | 0.04 |
| 1.05:0.95 | 0.1 |
| 1.5:1 | 0.5 |
| 2.0:1 | 1.0 |
| 3.0:1 | 2.0 |
| 4.0:1 | 3.0 |
| 5.0:1 | 4.0 |
| 6.0:1 | 5.0 |
| 7.0:1 | 6.0 |
| 11.0:1 | 10.0 |
| 21.0:1 | 20.0 |

It will thus be noted that as the halidite content of the phosphorus trichloride-alkylene oxide reaction mixture increases, the number of said units in the polyphosphorus compounds appears to increase asymptotically. Thus from a 1:101 phosphite-halidite mixture, the calculated average number of said units in the polyphosphorus compound is 100. For practical purposes and in order to obtain products of value for presently desired industrial application, it is preferred to operate in such a manner that the average number of said units is, say, from 1 to 10, and more advantageously from 1 to 4.

As will be apparent to those skilled in the art, the term "average units" when applied to repetitive portions of a high molecular weight composition indicates a mixture in which there is present varying numbers of such units. Hence, in a composition which is stated to have, say, an average of 10 repeating units there will be present compounds having less than 10 such units as well as compounds having more than 10 units.

It is thus apparent that so long as there is employed in the reaction with the aldehyde a mixture of phosphorohalidite and tribasic phosphite which is prepared by addition of two moles of phosphorus trihalide with more than four, but less than five moles of alkylene oxide, and the quantity of aldehyde used is at least equimolar with respect to the phosphorohalidite content of the so obtained phosphorus trichloride-alkylene oxide reaction product, there is present in the final reaction product a substantial quantity of phosphite-polyphosphonate.

As hereinbefore disclosed, the trivalent phosphorus halogen components which are generally useful in preparing the presently provided polyphosphonate or polyphosphinate compounds have the general formula

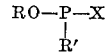

wherein R is selected from the class consisting of alkyl, haloalkyl, alkenyl, haloalkenyl, alkoxyalkyl, aryloxyalkyl, alkoxyhaloalkyl, and aryloxyhaloalkyl radicals of from 1 to 12 carbon atoms, R' is selected from the class consisting of —OR and hydrocarbyl and halohydrocarbyl radicals of from 1 to 12 carbon atoms and X is selected from the class consisting of chlorine and bromine.

An important class of phosphorus halogen compounds of the above formula are the phosphorohalidites, i.e., compounds of the formula (RO)₂PX. This includes the alkyl or alkenyl phosphorochloridites or phosphorobromidites, e.g., dimethyl, diethyl, diisopropyl, di-n-propyl, diisobutyl, di-n-butyl, di-n-amyl, di-n-hexyl, di-n-heptyl, di-n-octyl, bis(2-ethylhexyl), di-tert-nonyl, didecyl, diundecyl, di-n-dodecyl, bis(2-butyloctyl), di-tert-dodecyl, divinyl, diallyl, di-2-butenyl, di-2-pentenyl, dioctenyl, didodecenyl, allyl butyl, ethyl methyl, isohexyl methyl, dodecenyl ethyl and 2-ethylhexyl n-propyl phosphorochloridite or phosphorobromidite. Particularly useful are the haloalkyl phosphorohalidites, e.g., bis(2-chloroethyl), bis(2,3-dichloropropyl), bis (2-bromopropyl), bis(2-bromo-3-chloropropyl), bis(3-bromo-2-chloropropyl), bis(tetrachlorobutyl), bis(2-chloropropyl), bis(dichloroamyl), bis(dichlorododecyl), 2-chloroethyl methyl, allyl 2-bromopropyl, dibromohexyl butenyl or 2-chloropropyl dodecyl phosphorochloridite or phosphorobromidite. Also presently useful are the alkoxyalkyl or aryloxyalkyl phosphorohalidites such as bis(2-methoxyethyl), bis(2-ethoxyethyl), bis(4-butoxybutyl), bis(butoxyoctyl), 2-ethoxyethyl dodecyl, bis(3-ethoxypropyl), 2-ethoxyethyl 2-chloroethyl, allyl 4-methoxybutyl, bis(2-phenoxyethyl), bis[3-(β-naphthloxypropyl)], bis[4-(p-tolyloxy)butyl], 2-propoxyethyl 2-phenoxyethyl, and 3-(4-ethylphenoxy)-propyl 2-bromoethyl phosphorochloridite or phosphorobromidite.

Also useful are the haloalkenyl phosphorohalidites e.g. the bis(2-chloro-3-pentenyl) phosphorochloridite obtained by reaction of phosphorus trichloride with 4,5-epoxy-2-pentene.

The alkoxyhaloalkyl or aryloxyhaloalkyl phosphorochlorides obtained by reaction of glycidyl ethers with phosphorus trichloride or phosphorus tribromide are likewise very useful phosphorus-halogen reactants, as will be hereinafter disclosed.

Also useful in the reaction with aldehydes and triorgano phosphites to give the present poly phosphorus compounds are the esters of hydrocarbyl- or halohydrocarbylphosphonohalidites, i.e., compounds of the formula

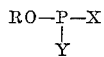

wherein R is as above defined and Y denotes a hydrocarbyl or halohydrocarbyl radical of from 1 to 12 carbon atoms.

Presently useful hydrocarbylphosphonohalidites or halohydrocarbylphosphonohalidites include, e.g., methyl phenylphosphonochloridite,
ethyl α-naphthylphosphonochloridite,
ethyl 2-fluoroethylphosphonochloridite,
2-ethoxyethyl methylphosphonobromidite,
n-butyl benzylphosphonochloridite,
n-amyl p-tolylphosphonobromidite,
isopropyl cyclohexylphosphonochloridite,
3-ethoxy-2-chloropropyl 2,4-diethylphenylphosphonobromidite,
3-phenoxypropyl 2,3-dichlorophenylphosphonochloridite,
2-fluoroethyl n-butylphosphonochloridite,
2-butyloctyl n-propylphosphonochloridite,
methyl α-chlorobenzylphosphonochloridite,
amyl decylphosphonochloridite,
2-bromo-4-ethoxybutyl p-biphenylphosphonochloridite,
undecyl n-hexylphosphonobromidite,
ethyl tetrachlorobutylphosphonochloridite,
n-hexyl 2-methylcyclopentylphosphonobromidite,
ethyl 4-n-hexylphenylphosphonochloridite,
allyl 2-phenylethylphosphonochloridite,
2-bromo-3-hexenyl phenylphosphonochloridite,
n-dodecyl 2-ethylhexylphosphonochloridite,
2-chloroethyl phenylphosphonochloridite,
tetrachloropentyl ethylphosphonochloridite,
3-bromopropyl n-hexylphosphonochloridite,
2-bromopropyl β-bromo-α-naphthylphosphonobromidite,
dibromododecyl methylphosphonobromidite,
2-iodoethyl benzylphosphonochloridite,
n-octyl 4-iodophenylphosphonochloridite,
trichlorooctyl cyclohexylphosphonochloridite,
4-fluorobutyl α-naphthylphosphonochloridite, ethyl 3-butenylphosphonochloridite,
2-chloropropyl 2-hexenylphosphonochloridite,
2-chloro-4-ethoxybutyl n-butylphosphonochloridite, etc.

Any of the above described trivalent phosphorus halogen compounds can be reacted with an equimolar amount of an aldehyde and a triorgano phosphite in less than equimolar quantity to give the presently provided poly phosphorus compounds.

The useful adehydes have the formula ZCHO wherein Z is selected from the class consisting of hydrogen and hydrocarbyl, halohydrocarbyl, carboalkoxyhydrocarbyl, alkylthiohydrocarbyl, alkoxyhydrocarbyl and cyanohydrocarbyl radicals of from 1 to 12 carbon atoms, and the thienyl and furyl radicals.

Owing to their easy availability, a particularly useful class of aldehydes includes the aliphatic hydrocarbon aldehydes of from 1 to 18 carbon atoms, e.g., formaldehyde, acetaldehyde, acrolein, propionaldehyde, butyraldehyde, isovaleraldehyde, hexanal, citronellal, heptanal, tiglic aldehyde, 2-ethylhexanal, octanal, 2-butyloctanal, propargaldehyde, 6-methylheptanal, amylpropiolic aldehyde, decanal, undecanal, 2-methylundecanal, lauraldehyde, stearaldehyde, tridecaldehyde, etc.

The presence of cyano, halogen, alkyl, carboalkoxy, alkoxy and alkylthio-substituents in the aliphatic aldehyde has no effect on the course of the reaction; hence, there may be employed such substituted fatty aldehydes as 3-cyanopropionaldehyde, chloroacetaldehyde, 3-butoxybutyraldehyde, 4-cyano-2,2-dimethyl butyraldehyde, 2,3-dichloropropionaldehyde, chloral, 3-isopropoxypropionaldehyde, 3-(ethylthio)-3-methylbutyraldehyde, 2-methyl-3-fluoropropionaldehyde, dibromostearaldehyde, dichlorolauraldehyde ethyl 11-formylundecanoate, succinaldehydic acid methyl ester, ethyl 4-formylbutyrate, diethyl formylsuccinate, iodoacetaldehyde, dichloroacetaldehyde, etc.

Presently useful alicyclic carboxaldehydes include cyclohexanecarboxaldehyde, 6-methyl-3-cyclohexenecarboxaldehyde, 2-cyclohexene-1-carboxaldehyde, cyclopentanecarboxaldehyde, 3-isopropyl-1-methylcyclohexanecarboxaldehyde, 5-ethoxy-2-cyclopentene-1-carboxaldehyde, 1-bromo-2,2,6-trimethylcyclohexanecarboxaldehyde, 2,2,6-trimethylcyclohexanecarboxaldehyde, 2,2,6-trimethyl-2-cyclohexenecarboxaldehyde, 4-chlorocyclohexanecarboxaldehyde, etc. The heterocyclic aldehydes includes furfural and the thiophenecarboxaldehydes.

The presently useful benzenoid aldehydes may be aliphatic-aromatic or purely aromatic aldehydes which may or may not be further substituted, e.g., benzaldehyde, o-, m- or p-tolualdehyde, phenylacetaldehyde, dipentylbenzaldehyde, cinnamaldehyde, 1- or 2-naphthaldehyde, biphenyl-4-carboxaldehyde, α-phenylacrolein hydrocinnamaldehyde, 2,3-dichlorobenzaldehyde, phenylpropargaldehyde, 2-, 3- or 4-butoxybenzaldehyde, o-, m- or p-chlorobenzaldehyde, p-(ethoxy)benzaldehyde, 2-ethoxybenzaldehyde, 3,4-dipropoxybenzaldehyde, 4-(n-butylthio)benzaldehyde, o-, m- or p-iodobenzaldehyde, 3,4- or 3,5-dibromobenzaldehyde, 5-tert-butyl-m-tolualdehyde, 5-tert-butyl-3-fluoro-o-tolualdehyde, 2-p-cymenecarboxaldehyde, 6-methoxy-2-naphthaldehyde, 2-butoxy-1-naphthaldehyde, 4'-bromo-4-biphenylcarboxaldehyde, etc.

Triorgano phosphites which are generally useful with the aldehyde and the phosphorus halide, according to the invention, are either simple or mixed phosphites. Examples of useful phosphites are trimethyl, triethyl, triallyl, triisopropyl, tri-n-propyl, tri-2-butenyl, tri-n-butyl, tri-tert-amyl, tri-n-hexyl, tri-n-heptyl, tris(2-ethylhexyl), trioctenyl, tri-n-octyl, trinonyl, tridecyl, triundecyl, tri-tert-dodecyl, tridodecenyl, amyl diethyl, butyl di-n-propyl, n-dodecyl dimethyl, ethyl octyl propyl, tris(2-chloroethyl), tris(3-chloropropyl), tris(2-chloropropyl), tris-(3,4-dichlorobutyl), tris(3-chloro-4-pentenyl), tris(2-bromethyl), tris(3-chloro-2-propenyl), tris(3-iodopropyl), tris(2-fluoroethyl), tris(dichlorododecyl), tris(2-ethoxyethyl), 2-chloroethyl diethyl, tris(3-phenoxypropyl), 3-bromopropyl, bis(2-chloroethyl), diamyl trichlorooctyl, 2-chloroethyl 3-chloropropyl 4-chlorobutyl, 2-chloroethyl methyl propyl, tris(2,3-dichloropropyl), tris(2-bromo-3-chloropropyl), tris(3-bromo-2-chloropropyl), tris(2- chloro-3-methoxypropyl) and tris(2-bromo-4-phenoxybutyl) phosphite.

Instead of the tribasic phosphites there may be employed as the trivalent phosphorus ester component a diester of a hydrocarbyl or halohydrocarbylphosphonite, i.e., a compound of the formula YP(OR)₂ where Y is selected from the class consisting of hydrocarbyl and halohydrocarbyl radicals of from 1 to 12 carbon atoms.

Presently useful phosphonites include, e.g., dimethyl phenylphosphonite, diethyl 2-propenylphosphonite, ethyl methyl phenylphosphonite, di-n-propyl methylphosphonite, di-n-butyl benzylphosphonite, bis(2-chloroethyl) p-tolylphosphonite, bis(2-methoxyethyl) cyclohexylphosphonite, bis(2-ethylhexyl) 2,4-diethylphenylphosphonite, bis(2-bromo-3-ethoxypropyl) 2 - bromoethylphosphonite, diethyl 2-propinylphosphonite, bis(2-butyloctyl) 2-butenylphosphonite, di-n-hexyl p-biphenylphosphonite, di-undecyl n-hexylphosphonite, bis(trichloropropyl) 2-methylcyclopentylphosphonite, diethyl 4-n-hexylphenylphosphonite, diallyl 2-phenylethylphosphonite, dipentenyl 2-ethylhexylphosphonite, bis(2-chloroethyl) phenylphosphonite, bis(tetrachloropentyl) ethylphosphonite, bis(3-bromopropyl) biphenylylphosphonite, bis(2-chloro-4-phenoxybutyl) methylphosphonite, 2-iodoethyl 2-bromo-3-chloropropyl phenylphosphonite, allyl propyl 2,4-dichlorophenylphosphonite, bis(trichlorooctyl) cyclohexylphosphonite, bis(4-fluorobutyl) 2-cyclohexenylphosphonite, bis(4-chlorobutyl) ethylphosphonite, bis(dichlorohexyl) phenylphosphonite, bis(2-chloropropyl) n-butylphosphonite, di-n-butyl pentachlorophenylphosphonite, etc.

Presently useful as the ester component are also phosphinites of the formula Y₂POR wherein Y and R are as herein defined, e.g., the alkyl or alkenyl dihydrocarbylphosphinites such as ethyl, allyl, butyl, n-octyl diethylphosphinite or diphenylphosphinite, benzylcyclohexylphosphinite or diallylphosphinite; the corresponding haloalkyl esters such as 2-chloropropyl di-p-tolphosphinite or 2-fluoroethyl ethylmethylphosphinite; the ether-substituted esters such as 4-methoxybutyl or 3-phenoxy-2-chloropropyl di-n-butylphosphinite or di-β-naphthylphosphinite; and the corresponding esters of the halo-substituted phosphinic acids such as the methyl, pentyl, ethyl, 2-butenyl, 2-chloroethyl, 3-ethoxypropyl, or 4-butoxy-2-bromopentyl esters of bis(2-chloropropyl) phosphinite or of n-butyl(4-chlorophenyl)phosphinite.

The alkyl radical of a trialkyl phosphite, of a dialkyl halohydrocarbylphosphonite, of a dialkyl hydrocarbylphosphonite, or of an alkyl dihydrocarbylphosphinite and halo derivatives thereof may also be one derived from a branched chain alcohol obtained according to the "Oxo" process by the reaction of carbon monoxide and hydrogen with a higher olefin, e.g., butylene dimer or propylene trimer.

As has been herein disclosed, the present invention is particularly suited to the production of phosphite-polyphosphonates from the mixtures of a phosphorochloridite or phosphorobromidite and less than an equimolar quantity of a triorgano phosphite which are obtained by reacting two moles of phosphorus trichloride or phosphorus tribromide with more than four moles but less than five moles of an oxirane compound e.g., an alkylene oxide.

Oxirane compounds suitable for reaction with the phosphorus trichloride or phosphorus tribromide to yield the mixtures of phosphite and phosphorochloridite are e.g., ethylene oxide and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyhexane, 1,2-epoxyheptane, 2,3-epoxy-3-ethylpentane, 1,2-epoxy-4-methylpentane, 1,2-epoxy-2-ethylhexane, 1-2-epoxy-2,4,4 - trimethylpentane, 1,2-epoxy-2,3-dimethylheptane, haloalkyl-substituted oxiranes such as epichlorohydrin, epibromohydrin, epiiodohydrin, epifluorohydrin, 1,2-epoxy-4-bromobutane, 2,3-epoxy-4-chlorobutane, 1,2-epoxy-3,4-dibromobutane, 2,3-epoxy-1-bromopentane, 3,4-epoxy-2-chlorohexane, 1,2-epoxy-3,3,3-trifluoropropane, 1-bromo-2,3-epoxyheptane; the alkenyl-substituted oxiranes such as 3,4-epoxy-4-methyl-1-pentene and 3,4-epoxy-1-butene; aryl-substituted oxiranes such as (epoxyethyl)benzene, (1,2-epoxy-1-methylethyl)benzene, (3-chloro-1,2-epoxypropyl)benzene and (1,2-epoxypropyl)benzene; alkoxyalkyl- and phenoxyalkyl-substituted oxiranes such as the methyl, ethyl, isopropyl, isoamyl and phenyl ethers of glycidol, i.e., compounds of the formula

where R is methyl, ethyl, isopropyl, amyl or phenyl; (2-ethoxyethyl)ethylene oxide, etc.

Reaction of two moles of phosphorus trichloride or of phosphorus tribromide with more than four but less than five moles of the useful oxiranes gives, by way of example, mixtures of the following phosphites and phosphorohalidites wherein the latter is present in molar excess:

(I) Tris(2-chloroethyl) phosphite and bis(2-chloroethyl) phosphorochloridite
(II) Tris(2,3-dichloropropyl) phosphite and bis(2,3-dichloropropyl) phosphorochloridite
(III) Tris(2-chloropropyl) phosphite and bis(2-chloropropyl) phosphorochloridite
(IV) Tris(2-bromoethyl) phosphite and bis(2-bromoethyl) phosphorobromidite
(V) Tris(2-bromopropyl) phosphite and bis(2-bromopropyl) phosphorobromidite
(VI) Tris(2,3-dibromopropyl) phosphite and bis(2-3-dibromopropyl) phosphorobromidite
(VII) Tris(3-bromo-2-chloropropyl) phosphite and bis-(3-bromo-2-chloropropyl) phosphorochloridite
(VIII) Tris(2-bromo-3-chloropropyl) phosphite and bis-(2-bromo-3-chloropropyl phosphorobromidite
(IX) Tris(2-chlorobutyl) phosphite and bis(2-chlorobutyl) phosphorochloridite
(X) Tris(2-bromobutyl) phosphite and bis(2-bromobutyl) phosphorobromidite
(XI) Tris(2-chloro-1-methylpropyl) phosphite and bis(2-chloro-1-methylpropyl) phosphorochloridite
(XII) Tris[(1-chloromethyl)butyl] phosphite and bis-[(1-chloromethyl)butyl] phosphorochloridite
(XIII) Tris[(1-bromomethyl)-tert-amyl] phosphite and bis[(1-bromomethyl)-tertamyl] phosphorobromidite
(XIV) Tris[(α - chloromethyl)benzyl] phosphite and bis[(α-chloromethyl)benzyl] phosphorochloridite
(XV) Tris(2-chloro-2-phenylethyl) phosphite and bis(2-chloro-2-phenylethyl) phosphorochloridite
(XVI) Tris(2-bromo-2-methyl-2-phenylethyl) phosphite and bis(2-bromo-2-methyl-2-phenylethyl) phosphorobromidite
(XVII) Tris(2-chloro-2-butenyl) phosphite and bis(2-chloro-3-butenyl) phosphorochloridite
(XVIII) Tris(2-chloro-2-ethylhexyl) phosphite and bis-(2-chloro-2-ethylhexyl) phosphorochloridite
(XIX) Tris(3-methoxy-2-chloropropyl) phosphite and bis(3-methoxy-2-chloropropyl) phosphorochloridite
(XX) Tris(3-phenoxy-2-bromopropyl) phosphite and bis(3-phenoxy-2-bromopropyl) phosphorobromidite
(XXI) Tris(3-iodo-2-chloropropyl) phosphite and bis(3-iodo-2-chloropropyl) phosphorochloridite Since reaction of the oxirane compound with the phosphorus trihalide proceeds through opening of the oxirane ring, there may be present in the above mixtures minor amounts of isomeric phosphite and isomeric phosphorohalidite, e.g., while in the reaction of phosphorus trichloride and propylene oxide the oxirane ring opens with preferential formation of tris(2-chloropropyl) phosphite and bis(2-chloropropyl) phosphorochloridite there may also be formed small quantities of tris(1-methyl-2-chloroethyl) phosphite and bis(1-methyl-2-chloroethyl) phosphorochloridite. The isomer content, if any, of the reaction mixture is of no consequence for the present purpose because the isomers also react with the carbonyl compound to give phosphite-phosphonates. While the small quantity of isomeric phosphite-phosphonate present in the final reaction product may be considered to constitute an impurity, it is not detrimental in practical application, for the isomers are so closely related that they possess substantially the same utility. Thus, the content of, say, a small quantity of the bis(1-methyl-2-chloroethyl) phosphite of bis(1-methyl-2-chloroethyl) (1-hydroxyethyl) phosphonate in the bis(2-chloropropyl) phosphite of bis(2-chloropropyl) (1-hydroxyethyl) phosphonate, which may be present in the reaction product of acetaldehyde and the mixture of phosphite and phosphorochloridite obtained from two moles of phosphorus trichloride and more than four but less than five moles of propylene oxide, generally does not limit the utility of the latter. However, if desired, the isomeric impurity may be separated by generally known isolating procedures, i.e., chromatography, crystallization, etc.

Reaction of the phosphorus trichloride or phosphorus tribromide with the oxirane compounds takes place readily, generally by simply mixing the phosphorus halide with the oxirane compound in the appropriate ratio. Depending on the nature of the individual reactants, heating may or may not be required. Use of catalytic amounts of an acidic agent, e.g., hydrogen chloride or a compound which gives off hydrogen chloride under the reaction conditions, e.g., ethylene chlorohydrin, is advantageous. Usually the reaction is exothermic, whereby cooling in order to maintain smooth reaction is advantageous. It is recommended that in such exothermic reactions the temperature be not allowed to rise above, say, from 60° C. to 80° C. An inert diluent may or may not be employed. When no diluent is used and there has been employed two moles of the phosphorus halide with more than four but less than five moles of the oxirane compound, the product consists of the halogenated triorgano phosphite and a molar excess of the halogenated diorgano phosphorohalidite. Hence, no isolating procedure is required before reaction with the aldehyde for preparation of the presently provided phosphite polyphosphonates. Noting cessation of change in refractive index, or of heat evolution in the case of exothermic reactions, or of change in viscosity of the reaction mass will suffice to determine when all of the initial reactants have been consumed. The main consideration in preparing the mixture of halogenated triorgano phosphite and halogenated diorgano phosphorohalidite is that the reactants be employed in a ratio of 2 moles of the phosphorus trihalide per more than 4, but less than 5, moles of the oxirane compound.

When formaldehyde is employed with a mixture of a phosphorohalidite and phosphorus ester obtained from two moles of phosphorus trihalide and more than four but less than five moles of an alkylene oxide, the polyphosphorus compounds have the formula

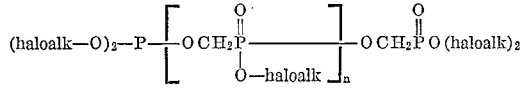

where haloalk denotes a haloalkyl radical of from 1 to 12 carbon atoms and $n$ is a number of at least 1. When the aldehyde is a fatty aldehyde, the products obtained from a mixture of phosphorohalidite and phosphorus ester obtained by reaction of, say, two moles of phosphorus trichloride with more than four, but less than five, moles of propylene oxide have the formula

in which alk denotes an alkyl radical of from 1 to 17 carbon atoms, and $n$ is a number of from 1 to 10. When the same reaction product of propylene oxide and phosphorus trichloride is treated with an aromatic aldehyde the products have the formula

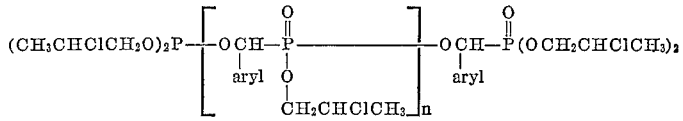

in which aryl denotes an aromatic hydrocarbon radical and $n$ is a number of from 1 to 10.

Reaction of a molar equivalent of the trivalent phosphorus halogen compound, a molar equivalent of the aldehyde and less than a molar equivalent of the trivalent phosphorus ester takes place readily by contacting the three reactants at ordinary or moderately decreased or increased temperatures and allowing the resulting reaction mixture to stand until formation of the polyphosphorus compound. Thus, the phosphorus halogen compound may be mixed with the phosphorus ester in the appropriate ratio or a mixture thereof may be prepared from a phosphorus trihalide and an oxirane compound as disclosed above, and the aldehyde may be added to the resulting mixture. Or, if desired, the aldehyde and the phosphorus ester may first be mixed and the phosphorus halogen compound added thereto. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the phosphorus-containing reactants, is increased. Also, when the aldehyde is either a higher alkanecarboxaldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product halide. Using the lower alkanecarboxaldehydes, which aldehydes are generally very reactive, external cooling is usually advantageous. When working with such active aldehydes optimum conditions comprise gradual addition of the aldehyde to the mixture of phosphite and phosphorus-halogen compound with application of external cooling and thorough stirring. Usually it suffices to maintain the reaction temperature at, say, from 10° C. to 50° C. during addition of the aldehyde. When all of the aldehyde has been added to said mixture and there is no longer any evidence of exothermic reaction, completion of the reaction may be assured by heating the reaction mixture to a temperature of from, say, 50° C. to 150° C. With the more sluggish aldehydes, e.g., 2-phenylacetaldehyde or lauraldehyde, it may be necessary to heat the reaction mixture moderately, say, to a temperature of about 50° C. before an exothermic reaction is initiated. Employing naphthaldehyde as the aldehyde reactant and a high molecular weight phosphite and phosphorus-halogen compound, even higher temperatures may be required, e.g., temperatures of from 100° C. to 150° C. appear to give the best yields.

As stated above, formation of the desired product, i.e., the poly phosphorus compound, is accompanied by the formation of a by-product halide. Thus, the reaction of, say, dimethyl phosphorochloridite, acetaldehyde and triethyl phosphite gives ethyl chloride and methyl chloride as by-products:

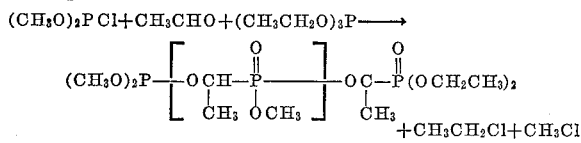

$$(CH_3O)_2PCl + CH_3CHO + (CH_3CH_2O)_3P \longrightarrow$$

$$(CH_3O)_2P\left[-OCH\underset{CH_3}{\underset{|}{-}}\overset{O}{\overset{\|}{P}}\underset{OCH_3}{\underset{|}{-}}\right]-OC\underset{CH_3}{\underset{|}{-}}\overset{O}{\overset{\|}{P}}(OCH_2CH_3)_2$$
$$+ CH_3CH_2Cl + CH_3Cl$$

The by-product halides are readily removed from the desired product by volatilization. However in many instances the by-product halides, particularly the halogenated alkanes are generally articles of commerce for which many applications exist. Thus, while many currently employed processes for the manufacture of organic compounds of phosphorus entail substantial waste of halogen in that by-products of little commercial importance are often formed, in the present instance, when starting from the phosphorus trihalideoxirane reaction products, all of the halogen constituent of the raw materials is converted to products of economic importance.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, or hexane. When employing no diluent and using substantially the stoichiometric proportion of reactants, the reaction product may be used directly for a variety of industrial and agricultural purposes without purification, i.e., it consists essentially of the poly phosphorus compound dissolved in the halide which is produced as a by-product in the reaction.

The presently provided poly phosphorus compounds are stable, generally high-boiling, materials which range from viscid liquids to waxy or crystalline solids. They are characterized particularly by having a higher degree of hydrolytic stability than do the products obtained from equimolar quantities of each of the three reactants, i.e., the phosphorus halogen compound, the aldehyde and the phosphorus ester. This probably stems from the fact that the presently provided compounds have only one trivalent phosphorus ester group and a plurality of pentavalent phosphorus groups. While the utility of the whole class of the present compounds will range somewhat with the nature of each of the three reactants, the new poly phosphorus compounds are generally useful as lubricant and gasoline additives, as functional fluids in electrical and force-transmitting applications, as foam-suppressing and foam-regulating agents, as biological and agricultural toxicants, as rubber compounding chemicals, and as adjuvants for synthetic resins and plastics. They are particularly valuable as flame-proofing agents for cellulosic and carbonaceous combustible materials generally. Application of the present compounds, e.g., to cotton cloth by padding a solution or suspension of the compound, results in a smooth, flame-proofed cloth of improved hand, and of good color, resiliency and strength.

In applications relating to synthetic resins and plastics the present poly phosphorus esters are surprisingly useful in that not only do they impart flame-proofing and heat-resistant characteristics thereto, but they also frequently demonstrate plasticizing properties. They are thus advantageously employed in the preparation of improved synthetics such as the phenolic, polyester, polyamide, and cellulose ester resins, in the vinyl polymers such as polyvinyl chloride, the polyvinyl acetals, polystyrene, polyethylene, vinyl chloride-vinyl acetate copolymers, olefin-maleic anhydride copolymers, polybutadiene and the copolymer elastomers such as butadiene-styrene or butadiene-acrylonitrile copolymers, etc. They are also very effectively used in the preparation of foamed resins, e.g., polystyrene foam or of polyester foams such as polyethylene terephthalate or the polyurethanes. Thus, use of the poly phosphorus compound with the required diisocyanate component and required hydroxy component in a quantity of, say, up to 40% of the mix gives foamed products which are not only flame-proofed but which also have been compatibly plasticized.

Those of the presently prepared poly phosphorus compounds which are gasoline-soluble are particularly useful as preignition additives for leaded gasolines. The invention thus provides an improved fuel for spark ignition internal combustion engines which consists essentially of gasoline, an organo lead anti-knock and the gasoline-soluble poly phosphorus compound, said compound being present in said fuel in a quantity sufficient to suppress preignition of the fuel.

Preignition is the ignition of the combustible mixture of air and fuel prior to firing by the spark plug. This occurs when deposits of readily glowing material build up in the combustion chamber. When the fuel is a gasoline containing an organolead anti-knock together with a halohydrocrabon scavenger, such readily glowing deposits comprise carbon in a mixture with lead halides; the latter acting to reduce the normal ignition temperature of carbon. Since reduction of the ignition temperature tends to increase with increasing concentration of the organolead anti-knock, preignition is a problem which becomes particularly troublesome as use of high compression engines becomes more prevalent. The deposits of carbon and lead salt retain sufficient heat from the previous firing cycle in enough quantity to permit them to glow, and if the glowing period (which depends on ease of ignition, and hence the lead content of the deposit) is long enough, the fuel is fired in the next cycle before it can be fired by the spark plug. The erratic firing which thus results is demonstrated by a "wild ping" or a dull, thudding knock. It is generally accompanied by increased detonation, spark-plug fouling, and reduction of exhaust valve life.

It has now been found that preignition and the various difficulties consequent thereto can be substantially suppressed or entirely eliminated by incorporating the gasoline-soluble poly phosphorus compound into the leaded gasoline in a preignition-inhibiting quantity. Such a quantity, of course, will depend upon the content of organolead compound and halohydrocarbon scavenger in the fuel. Leaded gasolines usually contain an antiknocking quantity of an organolead compound such as tetraethyllead, tetramethyllead, dimethyldiethyllead, and tetraphenyllead and substantially the amount of hydrocarbon halide scavenger, say, ethylene dibromide, ethylene dichloride acetylene tetrabromide, or mono- or polyhalopropane, butane, or pentane, or polyhaloalkyl benzene, which is calculated to react with the organolead compound to give a lead halide, e.g., lead bromide when the organolead compound is tetraethyllead and the halohydrocarbon is ethylene dibromide. The quantity of the present poly phosphorus compound which will suppress preignition of the leaded hydrocarbon fuel will depend upon the quantity of lead present in the fuel.

The invention is further illustrated by, but not limited to, the following examples:

*Example 1*

This example describes the production of a phosphite-diphosphonate by reaction of acetaldehyde with a mixture of phosphite and phosphorochloridite prepared from two moles of phosphorus trichloride and 4.67 moles of propylene oxide.

The mixture of phosphite and phosphorochloridite was prepared as follows: A 2-liter flask was charged with 550 g. (4.0 moles) of phosphorus trichloride and 4.1 g. (0.05 mole) of ethylene chlorohydrin. It was immersed in a Dry Ice bath and 539 g. (9.28 moles) of propylene oxide was added thereto during 0.4 hour at a temperature of 10–15° C.

After removing a 6.0 g. sample of the resulting reaction mixture, the remaining reaction product, consisting of tris(2-chloropropyl) phosphite and bis(2-chloropropyl) phosphorochloridite in a one to two molar ratio, was treated with 129 g. (2.94 moles) of acetaldehyde during 0.2 hour at a temperature of 15–30° C. When the heat of reaction had subsided (about 0.2 hour after adition of the aldehyde) the reaction mixture was warmed at 55–85° C. for 0.75 hour. A 5.0 g. analytical sample was removed and the remainder was concentrated to a pot temperature of 142° C./0.3 mm. to give 300.2 g. (99% theoretical yield) of propylene dichloride in the Dry Ice trap and as residue 901 g. (100% theoretical yield) of phosphite-diphosphonate, $n_D^{25}$ 1.4803, of the formula

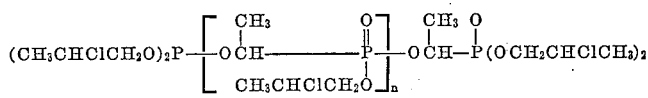

wherein $n$ has an average value of 1. Cryoscopic molecular weight determination of the product in benzene gave a value of 658 as compared to 680, the theoretical value. Nuclear magnetic resonance spectra for phosphorus showed characteristic chemical shifts at minus 141.6 p.p.m. (relative to $H_3PO_4$) for the trivalent phosphorus and at minus 21.5 p.p.m. for the pentavalent phosphorus. The product analyzed as follows:

|  | Found | Calcd. for $C_{19}H_{38}Cl_5O_9P_3$ |
| --- | --- | --- |
| Percent C | 33.32 | 33.5 |
| Percent H | 5.47 | 5.6 |
| Percent Cl | 26.08 | 26.1 |
| Percent P | 13.68 | 13.7 |

*Example 2*

This example shows preparation of a phosphite-diphosphonate by reaction of a phosphorochloridite and an aldehyde with a previously prepared phosphite of a hydroxyalkyl-phosphonate.

The bis(2-chloropropyl) phosphite of bis(2-chloropropyl) 1-hydroxyethylphosphonate was prepared by reaction of acetaldehyde with an equimolar mixture of bis(2 - chloropropyl) phosphorochloridite and tris(2-chloropropyl) phosphite. To 248 g. (0.5 mole) of this compound there was first added 126.8 g. (0.5 mole) of bis(2-chloropropyl) phosphorochloridite and to the reaction mixture there was introduced during a time of 0.2 hour, 26.4 g. (0.5 mole plus 20% excess) of acetaldehyde while maintaining the temperature of the reaction mixture at 25–35° C. by cooling. The whole was then warmed to 80–90° C. for 0.3 hour and then concentrated to 142° C./0.2 mm. to give 58.4 g. of distillate in the trap which formed a part of the reaction equipment (theory is 56.6 g. of by-product 1,2-dichloropropane plus 4.4 g. excess acetaldehyde), and 340.9 g. (100% theoretical yield) of the phosphite-polyphosphonate, $n_D^{25}$ 1.4807, of the structure

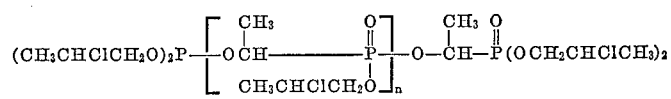

wherein $n$ has an average value of 1. This product was essentially identical to that prepared in Example 1.

*Example 3*

This example shows preparation of a mixture of tris(2-chloropropyl) phosphite and bis(2-chloropropyl) phosphorochloridite by reaction of two moles of phosphorus trichloride with 4.5 moles of propylene oxide and subsequent reaction of said mixture with acetaldehyde to obtain a condensate containing a plurality of phosphonate radicals and a single phosphite group.

A reaction vessel equipped with stirrer, thermometer, a protected water condenser and a protected dropping funnel was swept with nitrogen and then charged with 550 g. (4.0 moles) of phosphorus trichloride and 2.75 g. of ethylene chlorohydrin. The vessel was cooled in a Dry Ice bath as 522 g. (9.0 moles) of propylene oxide was added during 20 minutes at a temperature of 10–20° C. (largely 15–20° C.). The colorless reaction mixture was stirred for 0.5 hour to obtain a mixture consisting essentially of tris(2-chloropropyl) phosphite and bis(2-chloropropyl) phosphorochloridite in a one to three molar ratio.

Nuclear magnetic resonance study of the mixture gave a characteristic chemical shift of minus 168.5 p.p.m. for the phosphorochloridite and minus 141.8 p.p.m. for the phosphite.

To the mixture of phosphite and phosphorochloridite there was added, during 10 minutes, 145 g. (3.3 moles) of acetaldehyde. During addition of the aldehyde, the temperature of the reaction mixture was maintained at 15–20° C. by cooling, and it was maintained at this temperature for an additional 0.5 hour after all of the aldehyde had been added. At the end of this period, no further heat of reaction was evidenced, and in order to determine whether all of the chloridite had reacted, the mixture was warmed and another 5.0 g. portion of acetaldehyde was added. A 1.0° C. temperature rise was noted; but the addition of another 5.0 g. of the aldehyde caused no temperature change. The colorless reaction mixture was then warmed at 85–90° C. for 0.5 hour to assure complete reaction. By-product propylene dichloride was removed by placing the mixture under vacuum and concentrating, with stirring, to a pot temperature of 125° C./0.5 mm. There was thus obtain as residue 890.0 g. of a polyphosphonate-phosphite of the formula

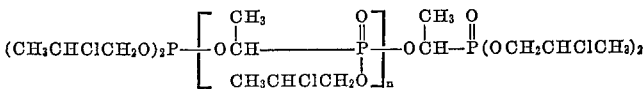

wherein $n$ has an average value of 2.

*Example 4*

This example is like Example 1 except that the phosphorus trichloride and the propylene oxide were employed in a 2:4.75 ratio.

Propylene oxide (552 g., 9.5 moles) was added, during 20 minutes, to a mixture consisting of 550 g. (4.0 moles) of phosphorus trichloride and 2.75 g. of ethylene chlorohydrin while maintaining the temperature of the reaction mixture at 10–20° C. (largely 15–20° C.). A 6.0 g. sample was removed for analysis. To the remainder of the reaction mixture, which consisted essentially of a mixture of tris(2-chloropropyl) phosphite and bis(2-chloropropyl) phosphorochloridite, there was added 127 g. of acetaldehyde, during 5 minutes, while maintaining the temperature of the reaction mixture at 18–20° C. by mild cooling. The colorless reaction mixture was then warmed at 85–90° C. for 0.5 hour, placed under vacuum and concentrated to a pot temperature of 125° C./1.0 mm. to remove by-product propylene dichloride. There was thus obtained as residue 934 g. of the colorless, liquid reaction product, $n_D^{25}$ 1.4797, of which two-thirds in moles consisted of a polyphosphonate-phosphite, of the formula

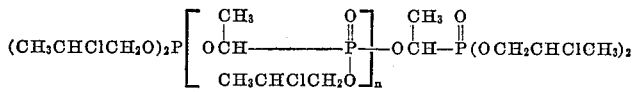

where $n$ is 1.

This mixture, which has an average atomic ratio of $C_{13}H_{26}Cl_{3.5}O_6P_2$, analyzed as follows:

|  | Found | Calcd. for $C_{13}H_{26}Cl_{3.5}O_6P_2$ |
| --- | --- | --- |
| Percent C | 33.77 | 33.65 |
| Percent H | 5.83 | 5.65 |
| Percent Cl | 26.62 | 26.75 |
| Percent P | 13.33 | 13.36 |

Example 5

This example is like Example 4 except that it was conducted on a large scale in the pilot plant.

The reaction mixture comprising the polyphosphonate-phosphite analyzed as follows:

|  | Found | Calcd. for $C_{13}H_{26}Cl_{3.5}O_6P_2$ |
| --- | --- | --- |
| Percent C | 33.56 | 33.65 |
| Percent H | 5.81 | 5.65 |
| Percent Cl | 26.59 | 26.75 |
| Percent P | 13.39 | 13.36 |

Hydrolytic stability of the present product was compared with the phosphite-phosphonate,

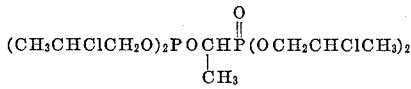

by adding 250 ml. of carbon dioxide-free distilled water to 25 g. of the test compound, stirring the resulting mixture for 24 hours and titrating with 0.1 N alcoholic sodium hydroxide in the presence of alcoholic thymol blue indicator. There was thus obtained a value of 0.816 milliequivalent of NaOH/g. sample for the phosphite-phosphonate and a value of only 0.402 for the present product.

Example 6

This example describes reaction of two moles of phosphorus trichloride with 4.5 moles of ethylene oxide to obtain a mixture of tris(2-chloroethyl) phosphite and bis(2-chloroethyl) phosphorochloridite and subsequent reaction of said mixture with acetaldehyde to obtain a polyphosphonate-phosphite.

To 1100 g. (8.0 moles) of phosphorus trichloride and 8.3 g. of ethylene chlorohydrin there was added 793 g. (18.0 moles) of ethylene oxide during 0.75 hour while maintaining the temperature of the reaction mixture at 10–20° C. (largely 10–15° C.). A 6.0 g. sample was removed for analysis and to the remaining mixture of tris (2-chloroethyl) phosphite and bis(2-chloroethyl) phosphoro-chloridite there was added 290 g. (6.6 moles, 10% excess) of acetaldehyde during 0.3 hour while maintaining the temperature of the reaction mixture at 25–30° C. by cooling. When all of the acetaldehyde had been added, cooling was discontinued and the temperature of the reaction mixture increased spontaneously to 52° C. The mixture was then warmed at 85–90° C. for 0.5 hour, cooled to 30° C. and then concentrated to a pot temperature of 110° C./1 mm. to give 553.5 g. of ethylene di- chloride in the Dry Ice trap and as residue a polyphosphonate-phosphite of the formula

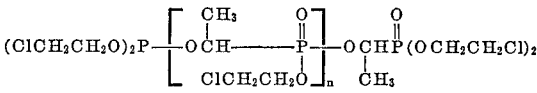

where $n$ has an average value of 2.

Testing of the hydrolytic stability of the presently prepared polyphosphonate-phosphite employing the procedure described in Example 5 gave a value of 0.966 milliequivalent of NaOH/g. sample as compared to 1.852, the value obtained by similar testing of the phosphite-phosphonate of the formula

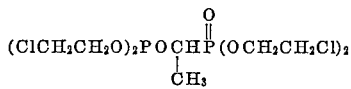

Example 7

This example shows the preparation of a phosphite-polyphosphonate from two moles of phophorus trichloride and 4.5 moles of ethylene oxide and acetaldehyde as in Example 6 but without removal of by-product ethylene dichloride.

A mixture of tris(2-chloroethyl) phosphite and bis(2-chloroethyl) phosphorochloridite was prepared by adding 793 g. (18.0 moles) of ethylene oxide to a mixture consisting of 1100 g. (8.0 moles) of phosphorus trichloride and 8.2 g. of ethylene chlorohydrin with cooling at 10–20° C. (largely 10–15° C.) during 1.25 hours.

After removing a 6.0 g. sample from the reaction product, the remainder, which consisted of tris(2-chloroethyl) phosphite and of bis(2-chloroethyl) phosphorochloridite in a 1:3 ratio, was treated with 290 g. (6.6 moles, 10% excess) of acetaldehyde at 20–30° C. during 0.2 hour. Cooling was applied to maintain this temperature during addition of the acetaldehyde and for another 0.7 hour after the aldehyde had been added. The reaction temperature was finally allowed to increase spontaneously to 41° C. The resulting reaction mixture consisted of an ethylene dichloride solution of the polyphosphonate-phosphite of the formula

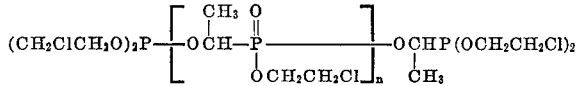

where $n$ has an average value of 2. Nuclear magnetic resonance measurements on this product showed a characteristic chemical shift of −142 p.p.m. (relative to $H_3PO_4$) for the trivalent phosphorus and of −22 p.p.m. for the pentavalent phosphorus.

Example 8

This example shows preparation of a polyphosphonate-phosphite by reaction of 1.75 moles of acetaldehyde with a mixture of tris(2-chloropropyl) phosphite and bis(2-chloropropyl) phosphorochloridite prepared by reacting two moles of phosphorus trichloridite with 4.25 moles of propylene oxide.

To a mixture consisting of 550 g. (4.0 moles) of phosphorus trichloride and 2.75 g. of ethylenechlorohydrin there was added, with cooling during 0.4 hour, 493 g. (8.50 moles) of propylene oxide. About the first two-thirds of the oxide was added at a temperature of 5–15° C. and the last one-third at 0–5° C. A 9.0 g. sample of the resulting reaction mixture was removed for analysis and the residual mixture, consisting essentially of tris(2-chloropropyl) phosphite and bis(2-chloropropyl) phosphorochloridite in a 1:7 molar ratio, was treated with 177 g. (4.0 moles, 15% excess) of acetaldehyde, during 0.3 hour with cooling, to keep the temperature of the reaction mixture at 20–25° C. When no further heat of reaction was evidenced, the mixture was warmed to 80° C. and maintained at 80–90° C. for 0.5 hour to assure complete reaction. It was then concentrated, with stirring, to 160° C./0.5 mm. to give as residue 398 g. of the colorless, viscous polyphosphonate-phosphite which analyzed as follows:

|  | Found | Calcd. for $C_{22}H_{44}Cl_{6}O_{12}P_{4}$ |
|---|---|---|
| Percent C | 33.35 | 33.0 |
| Percent H | 5.53 | 5.54 |
| Percent Cl | 22.59 | 22.1 |
| Percent P | 15.06 | 15.5 |

Testing of the hydrolytic stability of the presently prepared polyphosphonate-phosphite as described in Example 5 gave a value of 0.392 milliequivalent of NaOH/g. sample.

*Example 9*

This example shows reaction of two moles of phosphorus trichloride with slightly more than 4 moles of propylene oxide to obtain a mixture consisting essentially of a small amount of tris(2-chloropropyl) phosphite and a major portion of bis(2-chloropropyl) phosphorochloridite and reaction of said mixture with acetaldehyde.

Propylene oxide (233 g., 4.02 moles) was added during 0.2 hour to a mixture consisting of 275 g. (2.00 moles) of phosphorus trichloride and 1.5 g. of ethylene chlorohydrin while cooling to maintain the temperature of the reaction mixture at 5–15° C. during about the first one-third of the addition of the oxide and at minus 5–0° C. during the remainder of the addition. The resulting mixture of tris (2-chloropropyl) phosphite and bis(2-chloropropyl) phosphorochloridite was allowed to warm spontaneously to 20° C., a 6.5 g. sample of the mixture was removed for analysis and stirring of the whole was continued at room temperature for one hour. At the end of this time, 101 g. (2.3 moles, 15% excess) of acetaldehyde was added to the mixture during 0.2 hour with cooling to keep the temperature at 20–25° C. It was then allowed to stand for 0.3 hour while cooling to maintain the temperature at 20–30° C. At this point there was no further evidence of exothermal reaction and the reaction mixture was warmed at 80–90° C. for 0.5 hour. A 6.0 g. sample was removed for analysis and the remainder was concentrated to a pot temperature of 100° C./2.0 mm. to give as residue 443.5 g. of colorless, viscous polyphosphonate-phosphite.

*Example 10*

This example shows preparation of a polyphosphonate-phosphite by reacting two moles of PCl₃ with 4.75 moles of ethylene oxide to obtain a mixture of tris(2-chloroethyl) phosphite and bis(2-chloroethyl) phosphorochloridite and condensation of said mixture with 1.25 moles of acetaldehyde.

To a mixture consisting of 550 g. (4.0 moles) of phosphorus trichloride and 2.75 g. of ethylene chlorohydrin there was added 418 g. (9.5 moles) of ethylene oxide during 0.75 hour while cooling the reaction mixture at 12–20° C. with a Dry Ice bath. The whole was then stirred for one hour and a 6.0 g. sample removed for nuclear magnetic resonance study, whereby there were observed a characteristic chemical shift of minus 167.9 p.p.m. for the phosphorochloridite and a shift of minus 141.0 p.p.m. for the phosphite.

This mixture of tris(2-chloroethyl) phosphite and bis(2-chloroethyl) phosphorochloridite was cooled at 25–30° C. while 127 g. (2.89 moles, 15% excess) of acetaldehyde was added during 0.3 hour. The resulting reaction mixture was maintained at 25–30° C. for another 0.5 hour and then allowed to stand without cooling, whereby a maximum temperature of 59° C. developed spontaneously. When there appeared to be no further exothermic reaction, the reaction mixture was warmed at 80–90° C. for one hour and finally concentrated to a pot temperature of 125° C./0.1 mm. to give 239.5 g. of by-product ethylene chloride and as residue 843.5 g. of the colorless liquid reaction mixture, $n_D^{25}$ 1.4910, of which two-thirds in moles consisted of a polyphosphonate-phosphite of the formula $$(ClCH_2CH_2O)_2P\left[\begin{array}{c}CH_3\ \ \ \ O\\ |\ \ \ \ \ \ \ \|\\ OCH\text{—}P\\ |\\ ClCH_2CH_2O\end{array}\right]_n OCH\text{—}P(OCH_2CH_2Cl)_2 \atop \begin{array}{c}CH_3\ O\\ |\ \ \ \|\end{array}$$

where *n* is 1.

*Example 11*

This example describes the preparation of a polyphosphonate-phosphite by reacting two moles of phosphorus trichloride with 4.75 moles of propylene oxide to obtain a mixture of tris(2-chloropropyl) phosphite and bis(2-chloropropyl) phosphorochloridite and subsequent reaction of said mixture with formaldehyde.

To a cooled mixture consisting of 550 g. (4.0 moles) of phosphorus trichloride and 2.75 g. of ethylene chlorohydrin there was added, during 0.4 hour, 552 g. (9.5 moles) of propylene oxide while maintaining the temperature of the reaction mixture at 12–20° C. A 6 g. sample of the reaction mixture was removed. The remaining mixture of tris(2-chloropropyl) phosphite and bis-(2-chloropropyl) phosphorochloridite was warmed to 40° C. and 150 g. of formaldehyde was distilled into said mixture during 1.25 hours while maintaining the temperature of the reaction mixture at 45–65° C. by occasional cooling. The residue was then distilled to a pot temperature of 150° C., placed under vacuum and concentrated to a pot temperature of 160° C./0.05 mm. to give as residue 918 g. of the colorless, liquid reaction mixture of which two-thirds in moles consisted of a polyphosphonate-phosphite of the formula $$(CH_3CHClCH_2O)_2P\text{—}\left[\begin{array}{c}O\\ \|\\ \text{—}OCH_2P\text{—}\\ |\\ CH_3CHClCH_2O\end{array}\right]_n OCH_2\overset{O}{\overset{\|}{P}}(OCH_2CHClCH_3)_2$$

where *n* is 1.

*Example 12*

This example shows use of more than 10 times as much halidite and aldehyde as phosphite.

To a solution consisting of 15.6 g. (0.05 mole) of tris-(2-chloropropyl) phosphite and 139.5 g. (0.55 mole) of bis(2-chloropropyl) phosphorochloridite dissolved in 100 g. of chloroform, there was added during 0.1 hour, 29 g. (0.65 mole) of acetaldehyde, whereby there was obtained a spontaneous temperature increase to 55° C. The reaction mixture was then distilled to a pot temperature of 120° C. to give as residue the phosphite-polyphosphonate product of the formula

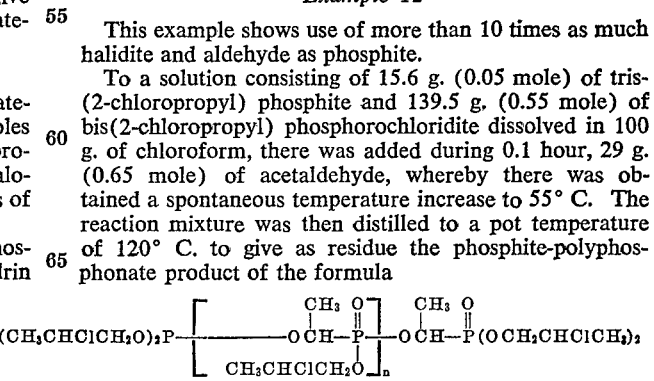

where *n* has an average value of 10.

*Example 13*

This example shows preparation of a phosphite-diphosphonate from triethyl phosphite and diethyl phosphorochloridite.

To a mixture consisting of 113 g. (0.72 mole) of diethyl phosphorochloridite and 60 g. (0.36 mole) of triethyl phosphite there was added 38 g. (0.86 mole) of acetaldehyde during 0.3 hour while maintaining the temperature of the reaction mixture at 20–25° C. The temperature was maintained at 25–30° C. for another 0.2 hour at which time there was no further evidence of exothermal heat. It was then warmed at 50–75° C. for one hour to assure complete reaction and concentrated to 100° C./0.05 mm. to give as residue 145 g. of the phosphite-polyphosphonate, $n_D^{25}$ 1.4522, of the formula

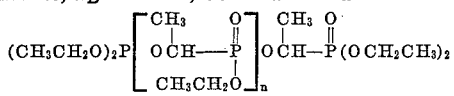

where $n$ has an average value of one.

Example 14

This example describes the preparation of a polyphosphonate-phosphite by reacting two moles of phosphorus trichloride with 4.9 moles of epichlorohydrin to obtain a mixture of phosphite and phosphorochloridite and reacting said mixture with acetaldehyde.

To a mixture consisting of 413 g. (3.0 moles) of phosphorus trichloride and 4.1 g. of ethylene chlorohydrin there was added, during 0.4 hour, 680 g. (7.35 moles) of epichlorohydrin. Because at the beginning of the addition of the epichlorohydrin only mild heat of reaction was noted, the reaction mixture was warmed to 60° C. At that point the reaction was sufficiently vigorous that the temperature remained at 60–65° C. without external heating during addition of the remainder of the epichlorohydrin. The temperature was then allowed to increase to 90° C. and it was maintained at 85–90° C. by moderate cooling for 0.75 hour. After standing overnight, a 6.0 g. sample of the reaction mixture was removed for analysis and to the remaining mixture of tris(2,3-dichloropropyl) phosphite and bis(2,3-dichloropropyl) phosphorochloridite there was added, during 0.3 hour, 83.5 g. (1.9 moles) of acetaldehyde while maintaining the temperature of the reaction mixture at 20–30° C. by cooling. It was then warmed to reflux (105° C.), then distilled to a pot temperature of 130° C. and finally concentrated to 150° C./2.0 mm. to give 987 g. of a colorless, liquid residue, of which two-thirds in moles consisted of a polyphosphonate-phosphite of the formula

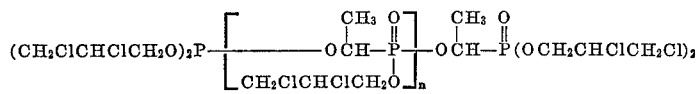

where $n$ is 1.

Example 15

This example describes the preparation of a polyphosphonate-phosphite by the reaction of two moles of phosphorus tribromide with 4.9 moles of epichlorohydrin to give a mixture of phosphite and phosphorobromidite and reaction of the resulting mixture with acetaldehyde.

To a mixture consisting of 507.0 g. (1.87 moles) of phosphorus tribromide and 2.5 g. of ethylene chlorohydrin there was added 415 g. (4.49 moles) of epichlorohydrin during 0.3 hour. There was only mild heat of reaction, so the temperature was allowed to increase spontaneously to 40° C. during addition of the epichlorohydrin. The reaction mixture was then maintained at 50–60° C. with mild cooling until there was no further heat of reaction (1.25 hour), and subsequently warmed for 0.5 hour at 55–60° C. to assure complete reaction. After removing a 10.0 g. sample of the reaction mixture for analysis, the remaining mixture of tris(2-bromo-3-chloropropyl) phosphite and bis(2-bromo-3-chloropropyl) phosphorobromidite was cooled to 20° C. and there was added thereto 57 g. (1.29 moles) of acetaldehyde during 0.1 hour while maintaining the temperature at 20–30° C. by cooling. When all of the aldehyde had been added, the mixture was kept at 50–55° C. for 0.5 hour by cooling, and when there was no further evidence of exothermal reaction, an additional 10 g. of acetaldehyde was added. A temperature rise of 1° C. was noted. The whole was then warmed to 80° C. and concentrated to 100° C./0.05 mm. to give by-product 2-bromo-1,3-dichloropropane in the Dry Ice trap which formed part of the equipment and as residue 850 g. of phosphonate-phosphite product, of which two-thirds in moles consisted of the polyphosphonate of the formula

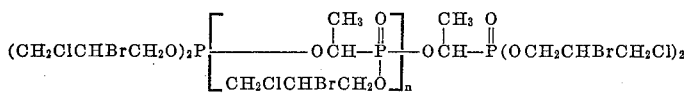

Evaluation of the hydrolytic stability of the presently prepared polyphosphonate-phosphite mixture using the method described in Example 5 gave a value of 0.304 milliequivalent of NaOH/g. sample.

Example 16

This example describes the preparation of a polyphosphonate-phosphite by reaction of two moles of phosphorus trichloride with 4.8 moles of 1,2-epoxy-3-isopropoxypropane to obtain a mixture of phosphite and phosphorochloridite and reaction of said mixture with undecaldehyde.

To a mixture consisting of 49.2 g. (0.358 mole) of phosphorus trichloride, 0.5 g. of ethylene chlorohydrin and 100 ml. of methylene dichloride there was gradually added, during 0.2 hour, 100 g. (0.860 moles) of 1,2-epoxy-3-isopropoxypropane while cooling the reaction mixture to maintain the temperature thereof at 20–30° C. The whole was then maintained at 25–30° C. for 0.2 hour and subsequently warmed at reflux for 0.3 hour. After removing a 5.0 g. sample of the reaction product for analysis, the remaining mixture of tris(2-chloro-3-isopropoxypropyl) phosphite and bis(2-chloro-3-isopropoxypropyl) phosphorochloridite was treated with 36.6 g. (0.215 mole) of n-undecanal during about 5 minutes at 35–47° C. The resulting reaction mixture was warmed at reflux for 1.0 hour, concentrated at water-pump pressure to 125° C., and finally to 135° C./1.0 mm. to give as residue 159.8 g. of a phosphite-phosphonate product, of which one-half in moles consisted of the polyphosphonate-phosphite of the formula

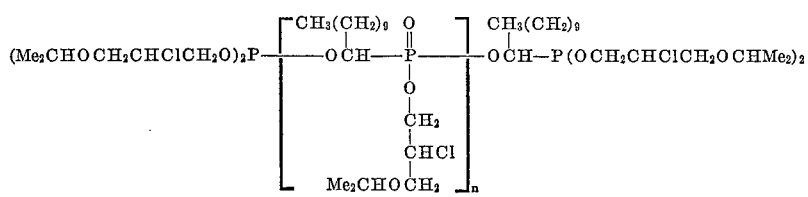

where Me is the methyl radical and $n$ is 1.

Evaluation of hydrolytic stability of the presently provided polyphosphonate-phosphite employing the proce-

Example 17

This example describes the preparation of a polyphosphonate-phosphite by the reaction of two moles of phosphorus trichloride with 4.8 moles of butadiene monoxide to obtain a mixture of phosphite and phosphorochloridite and reaction of said mixture with propionaldehyde.

To a cooled (10–15° C.) mixture consisting of 274.7 g. (2 moles) of phosphorus trichloride and 2.7 g. of ethylene chlorohydrin there was added, during 0.3 hour, 336 g. (4.8 moles) of butadiene monoxide. A 5.5 g. sample of the reaction mixture was removed and to the remaining mixture of tris(2-chloro-3-butenyl) phosphite and bis-(2-chloro-3-butenyl) phosphorochloridite there was added 101.5 g. (1.75 moles) of propionaldehyde during 0.3 hour at a temperature of 20–35° C. The whole was then warmed to 70° C. and concentrated to 102° C./4.0 mm. to give as residue 562.5 g. of phosphite-phosphonate product, of which one-half in moles consisted of the polyphosphonate-phosphite of the formula

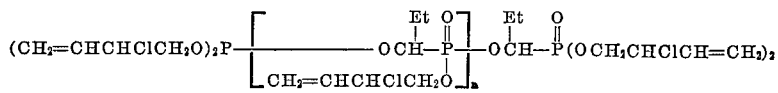

where Et is the ethyl radical and $n$ is 1.

Example 18

This example describes preparation of a polyphosphonate-phosphite by reaction of two moles of phosphorus trichloride with 4.8 moles of 1,2-epoxy-3-phenoxypropane and reaction of the resulting mixture of phosphite and phosphorochloridite with propionaldehyde.

To a mixture consisting of 137.3 g. (1.0 mole) of phosphorus trichloride, 1.5 g. of ethylene chlorohydrin and 200 ml. of methylene dichloride there was added, during 0.25 hour, 360 g. (2.4 moles) of 1,2-epoxy-3-phenoxypropane. The temperature of the reaction mixture increased spontaneously to reflux (pot temperature of 58° C.) during the addition and subsequent heat of reaction kept the mixture at reflux for 0.5 hour. It was then warmed with a heating mantle at reflux for one hour to assure complete reaction. To the resulting reaction mixture, comprising tris(2-chloro-3-phenoxypropyl) phosphite and bis(2-chloro-3-phenoxypropyl) phosphorochloridite, there was added 71.8 g. (1.24 moles) of propionaldehyde during 0.2 hour while maintaining the temperature of the reaction mixture at 35–50° C. by cooling. The whole was then warmed at reflux for 0.5 hour and concentrated to 115° C./2 mm. to give as residue 558 g. of a mixture of by-product 2,3-dichloropropyl phenyl ether and a phosphite-phosphonate product, of which 50% in moles consisted of the polyphosphonate-phospite of the formula

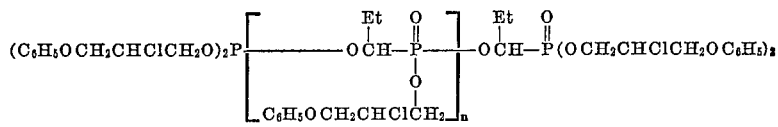

where Et is the ethyl radical and $n$ is 1.

Example 19

This example describes preparation of a polyphosphonate-phosphite by reaction of two moles of phosphorus trichloride with 4.8 moles of ethylene oxide to obtain a mixture of phosphite and phosphorochloridite and reaction of said mixture with furfural.

To a mixture consisting of 1100 g. (8.0 moles) of phosphorus trichloride and 8.2 g. of ethylene chlorohydrin there was introduced, during 1.2 hours, 845 g. (19.2 moles) of ethylene oxide at 10–20° C. To one-half (973 g.) of the resulting mixture of tris(2-chloroethyl) phosphite and bis(2-chloroethyl) phosphorochloridite there was added 231 g. (2.4 moles) of furfural during 0.2 hour. The whole was then warmed to 90° C. whereupon an exothermal reaction occurred and cooling was required to maintain the temperautre of the reaction mixture at 85–95° C. for 0.5 hour. It was finally warmed at 100–105° C. for 0.5 hour and concentrated to 100° C./2 mm. to give as residue a phosphite-phosphonate product, of which 50% in moles consisted of a phosphonate-phosphite of the formula

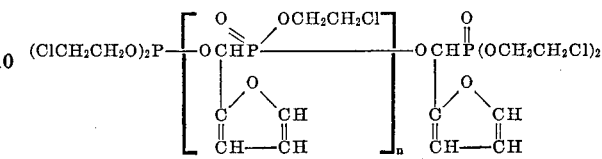

where $n$ is 1.

Example 20

This example describes the preparation of a polyphosphonate-phosphite by reaction of two moles of phosphorus trichloride and 4.8 moles of ethylene oxide and subsequent reaction of the resulting mixture of phosphite and phosphorochloridite with β-methylmercaptopropionaldehyde.

To 244 g. of the mixture of tris(2-chloroethyl) phosphite and bis(2-chloroethyl) phosphorochloridite prepared in Example 18 there was added, during 0.2 hour, 62.5 g. (0.6 mole) of β-methylmercaptopropionaldehyde while maintaining the temperature of the reaction mixture at 30–40° C. The whole was then warmed to 80° C. and concentrated to 102° C./0.3 mm. to give 59.5 g. of ethylene dichloride in the Dry Ice trap which formed a part of the reaction equipment and as residue a phosphite-phosphonate product, of which 50% in moles consisted of the polyphosphonate-phosphite of the formula

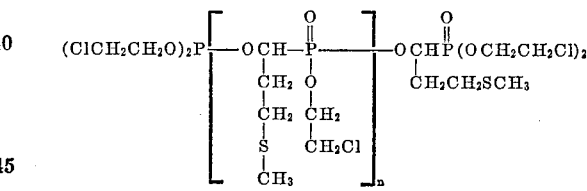

where $n$ is 1.

Example 21

This example describes preparation of polyphosphonate-phosphite by the reaction of two moles of phosphorus trichloride with 4.8 moles of ethylene oxide to obtain a mixture of phosphite-phosphorochloridite with subsequent reaction with acrolein.

To 486.5 g. of the mixture of tris(2-chloroethyl) phosphite and bis(2-chloroethyl) phosphorochloridite prepared in Example 18 there was added 70.6 g. of acrolein during one hour while maintaining the temperature at 10–20° C. by cooling. The whole was then warmed to 90° C. and concentrated to 140° C./0.3 mm. to give 437 g. of phosphite-phosphonate product of which 50% in moles consisted of the polyphosphonate-phosphite of the formula

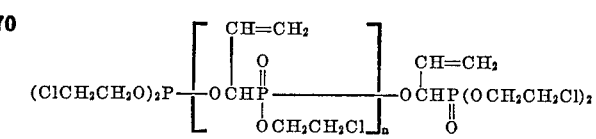

where $n$ is 1.

Example 22

This example describes the preparation of a polyphosphonate-phosphite wherein acrolein is employed as the aldehyde and the molar ratio of phosphorus trichloride and propylene oxide is 2:4.9.

To a cooled mixture consisting of 1100 g. (8.0 moles) of phosphorus trichloride and 8.2 g. of ethylene chlorohydrin there was added, during 0.8 hour, 1136 g. of (19.6 moles) of propylene oxide while maintaining the temperature of the reaction mixture at 10–20° C. (largely 10–15° C.). A 6.5 g. sample of the reaction mixture was removed and to the remaining mixture of tris(2-chloropropyl) phosphite and bis(2-chloropropyl) phosphorochloridite there was added during 0.25 hour, 246.6 g. (4.4 moles) of acrolein while maintaining the temperature of the reaction mixture at 24–30° C. by cooling. When cooling was discontinued the temperature of the reaction mixture increased spontaneously to 41° C. It was then heated to 103° C. and maintained at 85–103° C. for 0.75 hour. Concentration of the resulting reaction mixture to 120° C./1 mm. gave 455.5 g. of by-product propylene dichloride which collected in the Dry Ice trap forming part of the equipment and as residue a phosphonate-phosphite product, of which two-ninths in moles consisted of the polyphosphonate of the formula

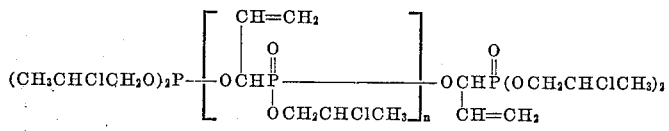

where $n$ is 1.

Example 23

This example discloses the use of an aldehyde ester in the preparation of a phosphite-polyphosphonate.

To 72 g. of a mixture of tris(2-chloroethyl) phosphite and bis(2-chloroethyl) phosphorochloridite prepared by the reaction of two moles of phosphorus trichloride with 4.8 moles of ethylene oxide there was added with ice-cooling in one portion, 19.5 g. (0.15 mole) of ethyl 3-formylpropionate. The temperature of the reaction mixture increased spontaneously from 28° C. to 52° C. When there was no further evidence of exothermal reaction, the mixture was warmed to 83° C. and then concentrated to a pot temperature of 122° C./0.6 mm. to give 13.4 g. of by-product ethylene dichloride in the Dry Ice trap and 78.5 g. of a phosphite-phosphonate product, $n_D^{25}$ 1.4863, of which 50% in moles consisted of a phosphite-polyphosphonate of the formula

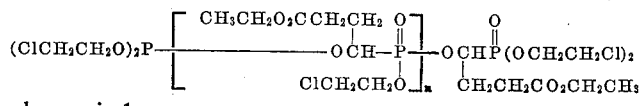

where $n$ is 1.

Example 24

To a mixture consisting of 716 g. (4.0 moles) of phenylphosphonous dichloride and 7.1 g. of ethylene chlorohydrin there was added 336 g. (5.8 moles) of propylene oxide during 0.25 hour while maintaining the temperature of the reaction mixture at 0–5° C. by means of Dry Ice cooling. The reaction was rapid, very exothermic, and was complete by the time all the propylene oxide had been added. A 7.0 g. sample of the reaction product was removed for analysis and to the remaining reaction product, consisting of 2-chloropropyl phenylphosphonochloridite and bis(2-chloropropyl) phenylphosphonite, there was added, during 0.2 hour, 197 g. (2.42 moles) of acetaldehyde. Moderate cooling was employed to keep the temperature below 32° C. during addition of the aldehyde and for about 0.25 hour after all of the aldehyde had been added. The colorless, viscous reaction mixture was then warmed at 55–65° C. for one hour and then concentrated to 90° C./1 mm. to give 207.5 g. of the by-product propylene dichloride in the Dry Ice trap which formed a part of the reaction equipment and as residue 946.5 g. of a phosphonite-phosphinate product, $n_D^{25}$ 1.5478 of which 22% in moles consisted of the poly phosphorus compound of the formula

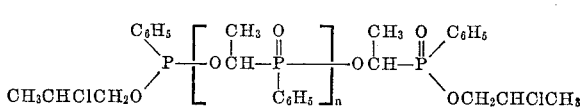

where $n$ is 1.

Example 25

This example describes preparation of a phosphite-diphosphonate having dissimilar alcohol residues.

To a solution consisting of 16.5 g. (0.065 mole) of bis(2-chloropropyl) phosphorochloridite and 5.4 g. (0.0325 mole) of triethyl phosphite in 30 ml. of methylene chloride there was added during 0.1 hour 3.8 g. (0.065 mole) of propionaldehyde while maintaining the temperature of the reaction mixture at 20°–30° C. by cooling. When heat of reaction was no longer evident (about 0.1 hour after all of the aldehyde had been added), the mixture was warmed at reflux for 0.5 hour, distilled to a pot temperature of 70° C., and then concentrated to 107° C./0.2 mm. There was thus obtained as residue the phosphite - polyphosphonate, $n_D^{25}$ 1.4696, of the formula:

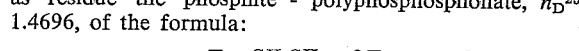
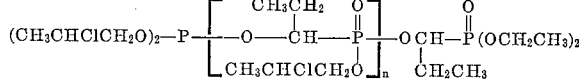

where $n$ has an average value of 1.

Example 26

This example shows testing of a phosphite-polyphosphonate product as a preignition additive for leaded gasoline.

Since it has been established that there is a close relationship between the quantity of a material required to suppress glowing and the effectiveness of the same material for reducing preignition of a leaded fuel in gasoline engines, testing of the presently prepared polyphosphonate-phosphites was conducted by a glow test method wherein the following procedure was employed:

Test blends were prepared by blending (1) 5 ml. of a fuel consisting of a high-boiling (380–420° F.) hydrocarbon fraction containing approximately 130 mg. of lead based on the quantity of a commercial tetraethyllead-halohydrocarbon additive (hereinafter referred to as TEL) which had been incorporated therein and 1 ml. of an SAE 30 grade lubricating oil with (2) graduated, precisely weighed quantities of the poly phosphorus compound to be tested, said quantities being in the range of 0.01 to 2.0 times the quantity of lead present. Two ml. of the test blend was then dropped at a constant rate (1.5±0.1 ml./15 minutes), during a 15–17 minute period, onto a reagent grade decolorizing carbon contained in a crucible maintained in a furnace at a temperature which was high enough to keep the bottom of the crucible at ca. 1,000° F. By using test blends containing progressively lower quantities of the test compound, there was determined the minimum concentration of the test compound at which no glowing of the carbon was evidenced either during the dropping period or after all of the test sample had been added. Under these conditions, a "control" sample, i.e., one which contained all of the constituents of the test blend execpt the poly phosphorus compound caused the carbon to glow throughout addition thereof and after addition had been completed. On the other hand, no glowing was observed when there was present in the test blend 0.0408 g./5 ml. of said fuel of the poly phosphorus compound prepared by reacting two moles of phosphorus trichloride with 4.75 moles of propylene oxide to obtain a mixture of bis(2-chloropropyl) phosphorochloridite and less than a molar equivalent of tris(2-chloropropyl) phosphite and reacting said mixture with a molar equivalent of acetaldehyde, i.e., the compound of Example 4.

Instead of the bis(2-chloropropyl) phosphorochloridite-tris(2-chloropropyl) phosphite-acetaldehyde reaction product shown above, there may be used, for the purpose of effectively inhibiting preignition of leaded fuels, any of the gasoline-soluble compounds prepared according to the present process. While, as will be obvious to those skilled in the art, the compound to be useful must be present in the gasoline in soluble form, it will also be realized that since the additive is employed in only very low concentrations, gasoline solubility at the useful concentrations is possessed by the great preponderance of the presently prepared compounds. Whether the poly phosphorus compound is soluble in the gasoline at the useful concentration can be readily ascertained by rountine experimentation.

Inasmuch as the crude reaction mixture obtained by the present process comprises an aliphatic halohydrocarbon as by-product, the latter obviously can serve conviently as the lead scavenger in leaded gasoline fuels containing the presently prepared poly phosphorus compounds.

Leaded gasolines containing the presently prepared compounds are compatible with other additives customarily used in the art, e.g., rust-inhibitors, stabilizers or antioxidants, dyes, etc. The polyphosphorus compounds of this invention may be employed in different proportions than specifically shown and with such other additives and adjuvants.

The presently provided process is particularly useful because of the broad variation of products that can be obtained. Not only can the reactants be varied to give innumerable products, but the ratio of reactants can be changed to even further multiply the products obtainable. Of considerable usefulness is the variation in properties, such as change of viscosity, volatility, fire resistance, hydrolytic stability, solubility, and polarity that can be made by change of reactant ratios.

What I claim is:

1. A compound of the formula

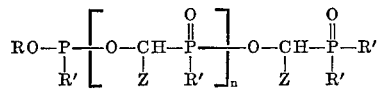

wherein R is selected from the class consisting of alkyl, haloalkyl, alkoxyalkyl, aryloxyalkyl, haloalkenyl, alkoxyalkyl, aryloxyalkyl, alkoxyhaloalkyl and phenoxyhaloalkyl radicals of from 1 to 12 carbon atoms, R' is selected from the class consisting of —OR monocyclic and aromatic hydrocarbon radicals of from 6 to 12 carbon atoms, Z is selected from the class consisting of hydrogen and alkyl, alkenyl, aryl, alkylthioalkyl, and carboalkoxyalkyl radicals of from 1 to 17 carbon atoms and the furyl radical, and $n$ is at least 1.

2. A compound of the formula

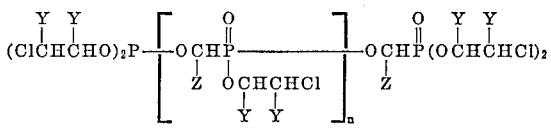

wherein Y is selected from the class consisting of hydrogen, alkyl, haloalkyl and alkenyl radicals of from 1 to 6 carbon atoms, and alkoxyalkyl and phenoxyalkyl radicals of from 2 to 7 carbon atoms, Z is selected from the class consisting of hydrogen and alkyl, alkenyl, aryl, alkylthioalkyl and carboxyalkyl radicals of from 1 to 17 carbon atoms, and the furyl radical, and $n$ is at least 1.

3. A compound of the formula

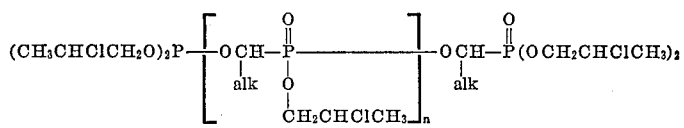

in which alk denotes an alkyl radical of from 1 to 17 atoms, and $n$ is at least 1.

4. A compound of the formula

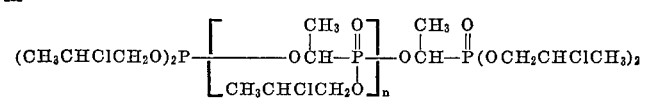

wherein $n$ is at least 1.

5. A compound of the formula

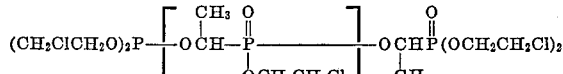

wherein $n$ is at least 1.

6. A compound of the formula

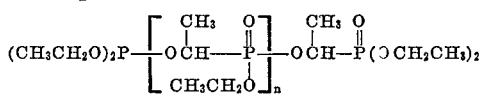

wherein $n$ is at least 1.

7. A compound of the formula

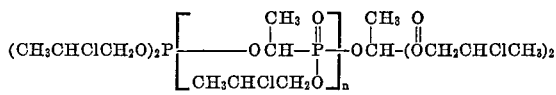

wherein $n$ is a number of at least 1.

8. A compound of the formula where Et is the ethyl radical, $C_6H_5$ denotes the phenyl radical, and $n$ is at least 1.

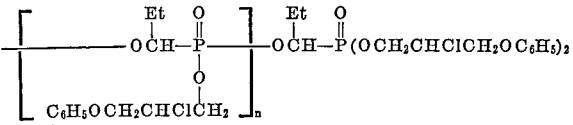

9. The method of preparing the compounds defined in claim 1 which comprises mixing together a molar equivalent of a phosphorus halogen compound of the formula

wherein R is selected from the class consisting of alkyl, haloalkyl, haloalkenyl, alkoxyhaloalkyl and phenoxyhaloalkyl radicals of from 1 to 12 carbon atoms, R' is selected from the class consisting of —OR monocyclic and aromatic hydrocarbon radicals of from 6 to 12 carbon atoms, X is selected from the class consisting of chlorine and bromine, at least a molar equivalent of an aldehyde of the formula

Wherein Z is selected from the class consisting of hydrogen and alkyl, alkenyl, aryl, alkylthioalkyl and carboalkoxyalkyl radicals of from 1 to 17 carbon atoms and the furyl radical, and less than a molar equivalent of an ester of the formula

R'₂P—OR wherein R' and R are as herein defined.

10. The method of preparing the compounds defined in claim 1 which comprises contacting a compound of the formula

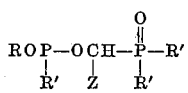

wherein R is selected from the class consisting of alkyl, haloalkyl, haloalkenyl, alkoxyhaloalkyl and phenoxyhaloalkyl radicals of from 1 to 12 carbon atoms, R' is selected from the class consisting of —OR monocyclic and aromatic hydrocarbon radicals of from 6 to 12 carbon atoms, and Z is selected from the class consisting of hydrogen and alkyl, alkenyl, aryl, alkylthioalkyl and carboalkoxyalkyl radicals of from 1 to 17 carbon atoms, and the furyl radical, with a phosphorohalidite of the formula

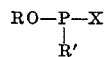

where R and R' are as herein defined and X is selected from the class consisting of chlorine and bromine, and at least an equimolar quantity with respect to the phosphorohalidite of an aldehyde of the formula Z—CHO where Z is as herein defined.

11. The method of preparing the compounds defined in claim 2 which comprises contacting substantially two moles of phosphorus trichloride with more than four but less than five moles of an oxirane compound of the formula

in which Y is selected from the class consisting of hydrogen, alkyl, haloalkyl and alkenyl radicals of from 1 to 6 carbon atoms, and alkoxyalkyl and phenoxyalkyl radicals of from 2 to 7 carbon atoms and in which the sum of the carbon atoms in the two Y radicals is not more than 10 to obtain a mixture of a phosphorochloridite of the formula

in which Y is as herein defined, and a phosphite of the formula

wherein Y is as herein defined, said phosphite being present in said mixture in a quantity less than equimolar with respect to said phosphorochloridite, and contacting said mixture with at least an equimolar amount with respect to the phosphorochloridite of an aldehyde of the formula

wherein Z is selected from the class consisting of hydrogen and alkyl, alkenyl, aryl, alkylthioalkyl and carboalkoxyalkyl radicals of from 1 to 17 carbon atoms and the furyl radical.

12. The method of preparing the compounds defined in claim 3 which comprises contacting two moles of phosphorus trichloride with more than four but less than five moles of propylene oxide to obtain a mixture of bis(2 - chloropropyl) phosphorochloridite and tris(2-chloropropyl) phosphite wherein the phosphorochloridite is in molar excess with respect to the phosphite, and contacting said mixture with at least an equimolar quantity, with respect to the phosphorochloridite, of an aldehyde of the formula alk—CHO wherein alk denotes an alkyl radical of from 1 to 17 carbon atoms.

13. The method of preparing the compounds defined in claim 4 which comprises contacting two moles of phosphorus trichloride with more than four but less than five moles of propylene oxide to obtain a mixture of bis(2-chloropropyl) phosphorochloridite and tris(2-chloropropyl) phosphite wherein said phosphorochloridite is in molar excess with respect to said phosphite and contacting said mixture with at least an equimolar quantity with respect to the phosphorochloridite of acetaldehyde.

14. The method of preparing the compounds defined in claim 5 which comprises contacting two moles of phosphorus trichloride with more than four but less than five moles of ethylene oxide to obtain a mixture of bis(2-chloroethyl) phosphorochloridite and tris(2-chloroethyl) phosphite wherein said phosphorochloridite is in molar excess with respect to said phosphite and contacting said mixture with at least an equimolar quantity, with respect to the phosphorochloridite, or acetaldehyde.

15. The method of preparing the compounds defined in claim 6 which comprises mixing together a substantially molar quantity of diethyl phosphorochloridite, a substantially molar quantity of acetaldehyde and less than a molar quantity of triethyl phosphite.

16. The method of preparing the compounds defined in claim 7 which comprises contacting two moles of phosphorus trichloride with more than four but less than five moles of epichlorohydrin to obtain a mixture of bis(2,3-dichloropropyl) phosphorochloridite and tris(2,3-dichloropropyl) phosphite wherein said phosphorochloridite is in molar excess with respect to said phosphite, and contacting said mixture with at least an equimolar quantity, with respect to the phosphorochloridite, of acetaldehyde.

References Cited in the file of this patent

UNITED STATES PATENTS

| | | |
|---|---|---|
| 2,634,288 | Boyer et al | Apr. 7, 1953 |
| 2,857,415 | Birum | Oct. 21, 1958 |
| 2,890,947 | Annable et al. | June 16, 1959 |
| 2,897,071 | Gilbert | July 28, 1959 |

UNITED STATES PATENT OFFICE
CERTIFICATE OF CORRECTION

Patent No. 3,014,954                      December 26, 1961

Gail H. Birum

It is hereby certified that error appears in the above numbered patent requiring correction and that the said Letters Patent should read as corrected below.

Column 2, lines 5 to 13, the lower right-hand portion of the formula should appear as shown below instead of as in the partent:

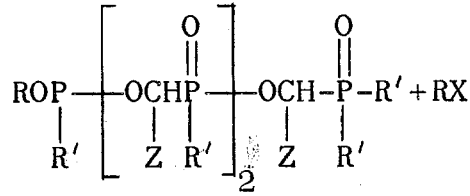

column 4, lines 55 to 61, the upper portion of the formula should appear as shown below instead of as in the patent:

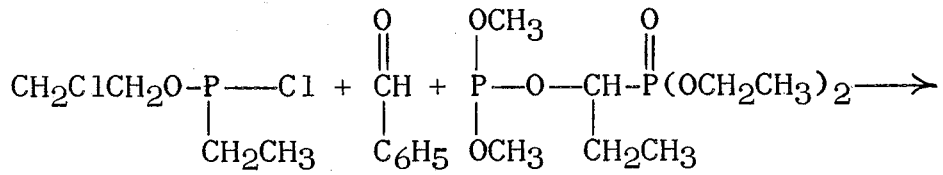

column 5, line 72, for "0.95:1:1.05" read -- 0.95:1.05 --; column 23, lines 23 to 26, the formula should appear as shown below instead of as in the patent:

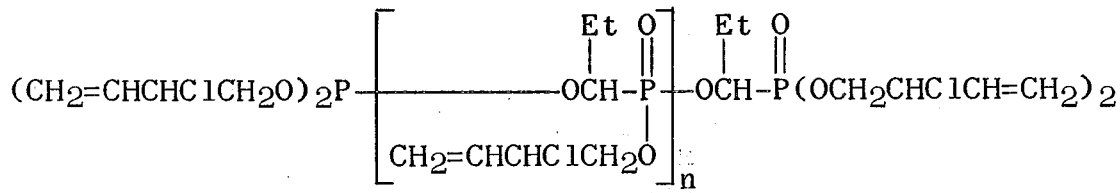

column 27, line 40, for "rountine" read -- routine --; column 28, lines 1 and 2, strike out "alkoxyalkyl, aryloxyalkyl,"; lines 54 to 57, the formula should appear as shown below, instead of as in the patent:

3,014,954

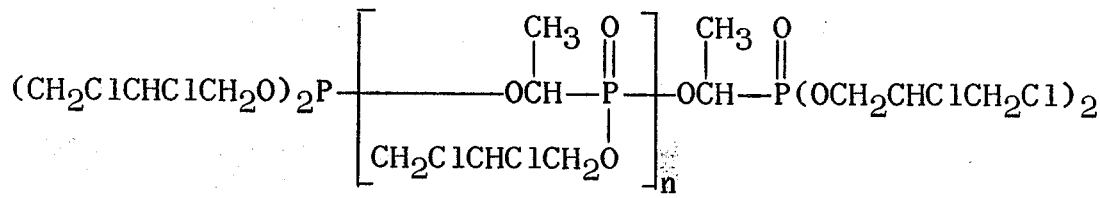

Signed and sealed this 11th day of December 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,014,954             December 26, 1961

Gail H. Birum

It is hereby certified that error appears in the above numbered patent requiring correction and that the said Letters Patent should read as corrected below.

Column 2, lines 5 to 13, the lower right-hand portion of the formula should appear as shown below instead of as in the partent:

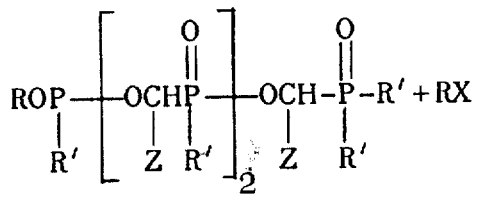

column 4, lines 55 to 61, the upper portion of the formula should appear as shown below instead of as in the patent:

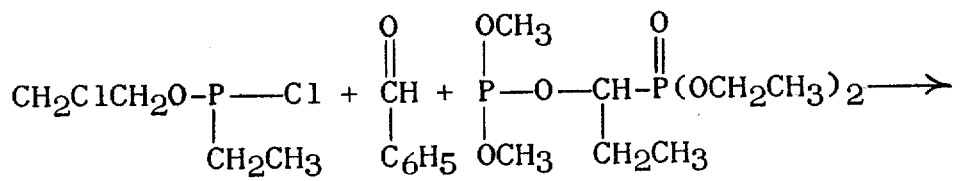

column 5, line 72, for "0.95:1:1.05" read -- 0.95:1.05 --; column 23, lines 23 to 26, the formula should appear as shown below instead of as in the patent:

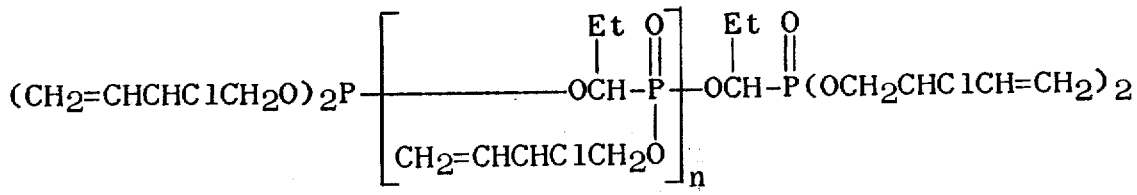

column 27, line 40, for "rountine" read -- routine --; column 28, lines 1 and 2, strike out "alkoxyalkyl, aryloxyalkyl,"; lines 54 to 57, the formula should appear as shown below, instead of as in the patent:

3,014,954

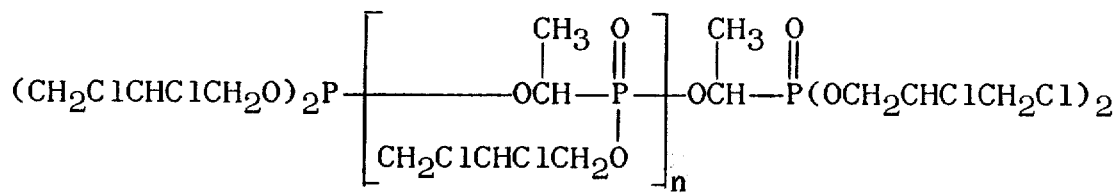

Signed and sealed this 11th day of December 1962.

(SEAL)
Attest:

ERNEST W. SWIDER
Attesting Officer

DAVID L. LADD
Commissioner of Patent